United States Patent
Duggal et al.

(10) Patent No.: US 10,409,858 B2
(45) Date of Patent: *Sep. 10, 2019

(54) DISCOVERY AND SHARING OF PHOTOS BETWEEN DEVICES

(71) Applicant: SHOTO, INC., San Francisco, CA (US)

(72) Inventors: Sachin Dev Duggal, San Francisco, CA (US); Mark Edward Rolston, San Francisco, CA (US)

(73) Assignee: Shoto, Inc., San Francisco, CA (US)

( * ) Notice: Subject to any disclaimer, the term of this patent is extended or adjusted under 35 U.S.C. 154(b) by 108 days.

This patent is subject to a terminal disclaimer.

(21) Appl. No.: 15/364,159

(22) Filed: Nov. 29, 2016

(65) Prior Publication Data

US 2017/0075927 A1  Mar. 16, 2017

Related U.S. Application Data

(63) Continuation of application No. 14/451,331, filed on Aug. 4, 2014, now Pat. No. 9,542,422.

(60) Provisional application No. 61/861,922, filed on Aug. 2, 2013.

(51) Int. Cl.
  *G06F 16/00* (2019.01)
  *G06F 16/58* (2019.01)
  *G06F 16/51* (2019.01)
  *G06F 16/2455* (2019.01)

(52) U.S. Cl.
  CPC ...... *G06F 16/5866* (2019.01); *G06F 16/2455* (2019.01); *G06F 16/51* (2019.01)

(58) Field of Classification Search
  CPC ......... G06F 17/30241; G06F 17/30265; G06F 17/3087; G06F 17/30268; G06F 21/10; G06F 21/6218; G06F 21/6245; G06F 3/048; G06F 17/30705
  See application file for complete search history.

(56) References Cited

U.S. PATENT DOCUMENTS

| | | | |
|---|---|---|---|
| 7,373,173 | B2 | 5/2008 | Brittan et al. |
| 7,653,302 | B2 | 1/2010 | Limberis et al. |
| 7,797,019 | B2 | 9/2010 | Friedmann |
| 8,194,940 | B1 | 6/2012 | Kiyohara et al. |
| 8,375,039 | B2 | 2/2013 | Schwartz et al. |
| 8,386,620 | B2 | 2/2013 | Chatterjee |
| 8,392,957 | B2 | 3/2013 | Holt et al. |
| 8,489,657 | B2 | 7/2013 | Shepherd et al. |
| 8,520,979 | B2 | 8/2013 | Conwell |
| 8,788,587 | B2 | 7/2014 | Balassanian et al. |

(Continued)

FOREIGN PATENT DOCUMENTS

| | | | |
|---|---|---|---|
| AU | 2012232990 A1 | 4/2014 | |
| JP | 6063067 B2 | 1/2017 | |

(Continued)

OTHER PUBLICATIONS http://www.geteversnap.com/how-does-it-work.html (accessed Aug. 2014).

(Continued)

*Primary Examiner* — Yicun Wu
(74) *Attorney, Agent, or Firm* — Brooks Kushman P.C.

(57) ABSTRACT

Described are systems, media, and methods for discovery of media relevant to a user and sharing the media with the user.

32 Claims, 44 Drawing Sheets

(56) References Cited

U.S. PATENT DOCUMENTS

| | | | |
|---|---|---|---|
| 8,799,756 B2 | 8/2014 | Grosz et al. |
| 8,799,829 B2 | 8/2014 | Grosz et al. |
| 8,824,748 B2 | 9/2014 | Tseng |
| 8,842,875 B2 | 9/2014 | Rodriguez |
| 8,880,528 B2 | 11/2014 | Houston et al. |
| 8,885,960 B2 | 11/2014 | Sauve et al. |
| 8,909,810 B2 | 12/2014 | Caine et al. |
| 8,934,717 B2 | 1/2015 | Newell et al. |
| 9,031,953 B2 | 5/2015 | Rathnavelu et al. |
| 9,049,388 B2 | 6/2015 | Gallagher et al. |
| 9,053,076 B2 | 6/2015 | Grosz et al. |
| 9,081,798 B1 | 7/2015 | Wong |
| 9,143,573 B2 | 9/2015 | Barak et al. |
| 9,143,601 B2 | 9/2015 | Padmanabhan et al. |
| 9,179,021 B2 | 11/2015 | Latta et al. |
| 9,223,802 B2 | 12/2015 | Morrison et al. |
| 9,256,620 B2 | 2/2016 | Amacker et al. |
| 9,280,545 B2 | 3/2016 | Padmanabhan et al. |
| 9,282,138 B2 | 3/2016 | Grewal et al. |
| 9,286,641 B2 | 3/2016 | Bosworth et al. |
| 9,325,709 B2 | 4/2016 | Beckmann et al. |
| 9,378,393 B2 | 6/2016 | Stoop et al. |
| 9,411,831 B2 | 8/2016 | Baldwin et al. |
| 9,424,270 B1 | 8/2016 | Zapata et al. |
| 9,438,858 B1 * | 9/2016 | Evans ............... H04N 7/15 |
| 9,544,379 B2 | 1/2017 | Gauglitz et al. |
| 9,591,039 B2 * | 3/2017 | O'Brien ............... H04L 65/403 |
| 9,600,484 B2 | 3/2017 | Davis et al. |
| 9,607,024 B2 | 3/2017 | Huibers et al. |
| 9,639,740 B2 | 5/2017 | Ganong et al. |
| 9,665,597 B2 | 5/2017 | Haitani et al. |
| 9,665,773 B2 | 5/2017 | Zomet et al. |
| 9,672,496 B2 | 6/2017 | Mitchell et al. |
| 9,721,148 B2 | 8/2017 | Ganong et al. |
| 9,727,565 B2 | 8/2017 | Pesavento et al. |
| 9,742,753 B2 | 8/2017 | Talley |
| 9,773,228 B2 | 9/2017 | Baldwin et al. |
| 9,858,348 B1 | 1/2018 | Higgins et al. |
| 9,892,203 B2 | 2/2018 | Houston et al. |
| 9,959,291 B2 | 5/2018 | Frigon |
| 9,986,048 B2 | 5/2018 | Garcia et al. |
| 10,019,136 B1 | 7/2018 | Ozog |
| 10,027,726 B1 | 7/2018 | Ozog |
| 10,027,727 B1 | 7/2018 | Ozog |
| 10,089,327 B2 | 10/2018 | Sweet, III et al. |
| 10,122,772 B2 | 11/2018 | Odio et al. |
| 10,135,765 B1 | 11/2018 | Skyrm et al. |
| 10,162,825 B2 | 12/2018 | Garcia |
| 10,162,999 B2 | 12/2018 | Papakipos et al. |
| 10,210,586 B2 | 2/2019 | Odio et al. |
| 2004/0148207 A1 | 7/2004 | Smith et al. |
| 2005/0190273 A1 | 9/2005 | Toyama et al. |
| 2006/0080286 A1 | 4/2006 | Svendsen |
| 2007/0008321 A1 | 1/2007 | Gallagher et al. |
| 2007/0073937 A1 | 3/2007 | Feinberg et al. |
| 2007/0086664 A1 | 4/2007 | Kim et al. |
| 2007/0086665 A1 | 4/2007 | Kim et al. |
| 2007/0255785 A1 | 11/2007 | Hayashi et al. |
| 2008/0040338 A1 | 2/2008 | Schwartz et al. |
| 2008/0147798 A1 | 6/2008 | Paalasmaa et al. |
| 2008/0306995 A1 | 12/2008 | Newell et al. |
| 2010/0063961 A1 | 3/2010 | Guiheneuf et al. |
| 2011/0029884 A1 | 2/2011 | Grosz et al. |
| 2011/0145275 A1 | 6/2011 | Stewart |
| 2011/0231745 A1 | 9/2011 | Levesque et al. |
| 2011/0258556 A1 | 10/2011 | Kiciman et al. |
| 2012/0124517 A1 | 5/2012 | Landry et al. |
| 2012/0154633 A1 | 6/2012 | Rodriguez |
| 2012/0183239 A1 | 7/2012 | Tsukagoshi et al. |
| 2012/0265758 A1 | 10/2012 | Han et al. |
| 2013/0021368 A1 | 1/2013 | Lee et al. |
| 2013/0110948 A1 | 5/2013 | Davis et al. |
| 2013/0311329 A1 | 11/2013 | Knudson et al. |
| 2013/0332526 A1 | 12/2013 | Hurley et al. |
| 2014/0019867 A1 | 1/2014 | Lehtiniemi et al. |
| 2014/0040712 A1 | 2/2014 | Chang et al. |
| 2014/0172863 A1 | 6/2014 | Imbruce et al. |
| 2014/0250175 A1 | 9/2014 | Baldwin et al. |
| 2014/0280267 A1 | 9/2014 | Perlegos |
| 2014/0280561 A1 | 9/2014 | DuBois |
| 2014/0304269 A1 | 10/2014 | Kiyohara et al. |
| 2015/0019523 A1 | 1/2015 | Lior et al. |
| 2015/0019643 A1 | 1/2015 | Balassanian et al. |
| 2015/0032535 A1 | 1/2015 | Li et al. |
| 2015/0039616 A1 | 2/2015 | Rolston et al. |
| 2015/0052165 A1 | 2/2015 | Sauve et al. |
| 2015/0213001 A1 | 7/2015 | Levy et al. |
| 2015/0261789 A1 | 9/2015 | Wong |
| 2015/0261813 A1 | 9/2015 | Pappula |
| 2015/0382167 A1 | 12/2015 | Padmanabhan et al. |
| 2016/0057188 A1 | 2/2016 | Padmanabhan et al. |
| 2016/0057218 A1 | 2/2016 | Reilly et al. |
| 2016/0105770 A1 | 4/2016 | Christian |
| 2016/0164988 A1 | 6/2016 | Grewal et al. |
| 2016/0202942 A1 | 7/2016 | Walkin et al. |
| 2017/0075927 A1 | 3/2017 | Duggal et al. |
| 2017/0091225 A1 | 3/2017 | Desmond et al. |
| 2017/0180961 A1 | 6/2017 | Gauglitz et al. |
| 2017/0193044 A1 | 7/2017 | Huibers et al. |
| 2017/0220601 A1 | 8/2017 | Barak et al. |
| 2017/0221095 A1 | 8/2017 | Gauglitz et al. |
| 2017/0221158 A1 | 8/2017 | Mitchell et al. |
| 2017/0222962 A1 | 8/2017 | Gauglitz et al. |
| 2017/0372674 A1 | 12/2017 | Xie et al. |
| 2018/0005168 A1 | 1/2018 | Baldwin et al. |
| 2018/0032997 A1 | 2/2018 | Gordon et al. |
| 2018/0046855 A1 | 2/2018 | Ganong et al. |
| 2018/0143987 A1 | 5/2018 | Houston et al. |
| 2018/0322146 A1 | 11/2018 | Frigon |
| 2018/0343225 A1 | 11/2018 | Parra |

FOREIGN PATENT DOCUMENTS

| | | |
|---|---|---|
| KR | 20110052137 A | 5/2011 |
| WO | WO2006/102656 A1 | 9/2006 |
| WO | WO2007/113462 A1 | 10/2007 |
| WO | WO2008/020940 A1 | 2/2008 |
| WO | WO2008/086314 A1 | 7/2008 |
| WO | WO2009/082814 A8 | 7/2009 |
| WO | WO2009/111825 A1 | 9/2009 |
| WO | WO2010/016866 A1 | 2/2010 |
| WO | WO2010/028169 A3 | 3/2010 |
| WO | WO2010/127308 A2 | 11/2010 |
| WO | WO2012/015919 A1 | 2/2012 |
| WO | WO-2012015919 A1 | 2/2012 |
| WO | WO2012/036861 A2 | 3/2012 |
| WO | WO-2012061327 A2 | 5/2012 |
| WO | WO2012/134756 A2 | 10/2012 |
| WO | WO2012/142054 A2 | 10/2012 |
| WO | WO2012/149332 A2 | 11/2012 |
| WO | WO2012/149336 A2 | 11/2012 |
| WO | WO2013/070639 A3 | 5/2013 |
| WO | WO2013/070816 A2 | 5/2013 |
| WO | WO2013/096320 A1 | 6/2013 |
| WO | WO2013/162976 A1 | 10/2013 |
| WO | WO2013/188682 A1 | 12/2013 |
| WO | WO2013/188854 A1 | 12/2013 |
| WO | WO2014/004062 A1 | 1/2014 |
| WO | WO2014/009599 A1 | 1/2014 |
| WO | WO2014/030161 A1 | 2/2014 |
| WO | WO2014/031546 A2 | 2/2014 |
| WO | WO2014/035729 A1 | 3/2014 |
| WO | WO2014/134238 A1 | 9/2014 |
| WO | WO2015/070320 A1 | 5/2015 |

OTHER PUBLICATIONS

PCT/US2014/049646 International Preliminary Report on Patentability dated Feb. 11, 2016.
PCT/US2014/049646 International Search Report and Written Opinion dated Dec. 17, 2014.
U.S. Appl. No. 14/451,331 Office Action dated Dec. 4, 2014.
U.S. Appl. No. 14/451,331 Office Action dated Mar. 23, 2015.

(56) References Cited

OTHER PUBLICATIONS

U.S. Appl. No. 14/451,331 Office Action dated May 19, 2016.
U.S. Appl. No. 14/451,331 Office Action dated Nov. 4, 2015.

\* cited by examiner

900

3700

4102

4100

DISCOVERY AND SHARING OF PHOTOS BETWEEN DEVICES

CROSS REFERENCE TO RELATED APPLICATIONS

The present application is a continuation of U.S. Application Ser. No. 14/451,331, filed Aug. 4, 2014, which claims priority from and is a non-provisional application of U.S. Provisional Application No. 61/861,922, filed Aug. 2, 2013, the entire contents of each of which are herein incorporated by reference for all purposes.

BACKGROUND OF THE INVENTION

More photos are being snapped today than at any other point in history. The explosion in popularity of phones equipped with cameras, paired with steady development in photo-sharing software has led to staggering statistics: 33% of the photos taken today are taken on a smartphone; over 1 billion photos are taken on smartphones daily; and 250 million photos are uploaded to Facebook every day. Despite the great opportunity for consumption of all these photographs, today's simplistic tools for sharing and viewing them leave much to be desired.

SUMMARY OF THE INVENTION

Consider one data point that highlights the shortcomings of today's photo sharing tools: greater than 90% of today's pictures that are taken are "lost" as not shared or uploaded (and lost with them, aside from sentimental value, is a great amount of potentially valuable data). There are many reasons for this. For instance, it is cumbersome to share photos from a certain event or general circumstance with others who also took part in those moments; current solutions require pre-inviting others to join group albums or creating static lists and/or circles. There is no way to do this automatically, specifically for each situation and in the background. Requesting others to share photos after the event is often an irritating request for all parties and the multitude of work-around solutions means most photos are not shared before they are superseded by new photos. Current sharing is also primarily one-to-one and it is difficult to organize photos such that there is currently no easy way to see a complete album of an event or moment in time that has been shared with others. This also means that it is also difficult for someone to see photos of themselves; 70% of pictures taken are of someone else. Further, current systems do not utilize phonebook connections to determine the strength of relationships.

Today's online storage, social, and messaging systems do not focus on reliving moments. Rather, they focus on workflow automation and content distribution. But people generally do not want to have to actively share content—they want to simply create and consume it. The present disclosure teaches novel ways to meet these desires and to ensure that far fewer photographs are "lost" due to the shortcomings of today's photo management and sharing solutions.

The present disclosure describes systems and methods for curating and consuming photographs and information derived from photographs. Embodiments of the disclosed system may employ contact mapping, phonebook hashing, harvesting of photo metadata, collection of ambient contextual information (including but not limited to recordings, high frequency sounds etc) and other techniques.

In one aspect, disclosed herein are methods for grouping a plurality of images from a plurality of users into an event, the method comprising: receiving, at a computing system, a first set of metadata from a first device associated with a first user and a second set of metadata from a second device associated with a second user, wherein: the first set of metadata is associated with a first image stored on the first device, and includes location information and time information for the first image, the second set of metadata is associated with a second image stored on the second device, and includes location information and time information for the second image; identifying, by the computing device, a first event based on the first set of metadata and the second set of metadata, wherein the first event has a defined beginning time and a defined end time; associating, by the computing device, the first image and the second image with the first event based on the location information or the time information associated with the first image and the second image; identifying, by the computing device, a relationship between the first user and the second user; and sending, by the computing device, a notification to the first user that the second user has an image associated with the first event. In some embodiments, the method further comprises: receiving a first set of contacts information from the first device and a second set of contacts information from the second device; and comparing the first set of contacts information with the second set of contacts information to identify a match, wherein the relationship between the first user and the second user is identified based on the match. In some embodiments, the first device stores a plurality of images and the method further comprises: associating a portion of the plurality of images with the first event on the first device. In some embodiments, the method further comprises: creating the first event using at least one of the first set of metadata and the second set of metadata. In some embodiments, the method further comprises: analyzing the first set of metadata and the second set of metadata; and inferring information about the first user and the second user based on the analyzing. In some embodiments, the method further comprises: generating a recommendation for the first user or the second user based on the analyzing. In some embodiments, the method further comprises: analyzing location information included in the first set of metadata and the second set of metadata; and determining a radius of proximity for the first event based on the analyzing. In some embodiments, the method further comprises: receiving additional location-related information from an external source; and defining properties of the first event using the additional information. In some embodiments, the method further comprises: receiving additional sets of metadata from additional devices associated with additional users; receiving sets of contacts information from the additional devices; receiving a first set of contacts information from the first device; analyzing the first set of contacts information, the additional sets of contacts information and the additional sets of metadata associated with each of the additional users; determining a plurality of users among the additional users who has at least one image associated with the first event; discovering a subset of users among the plurality of users whose contact information is included in the first set of contacts information; and informing the first user and about the determined subset of users. In some embodiments, the method further comprises: receiving a third set of metadata from the first device, wherein the third set of metadata is associated with a third image stored on the first device, and includes location information and time information for the third image; comparing the location information and time information for the third image to the location and time information of the first image or the second image; determining that the location information and time information for the third image is different from the location and time information of the first image or the second image; creating, by the computing device, a second event based on the third set of metadata, wherein the second event has a defined beginning time and a defined end time that is different than the first event; and associating the third image with the second event instead of the first event based on the location information or the time information associated with the third image. In further embodiments, the method further comprises: closing the first event. In some embodiments, the method further comprises: merging the first event and the second event into a merged event, wherein: a beginning time of the merged event is equal to or before than the beginning times of both the first event and the second event, and an end time of the merged event is equal to or after than the end times of both the first event and the second event. In some embodiments, the method further comprises: receiving an instruction from the first user to share the first image with the second user; and making the first image available to the second user. In some embodiments, the first device stores a plurality of images and the method further comprises: receiving a query from the first user to identify one or more images on the first device that belongs to a given event; analyzing sets of metadata associated with the plurality of images; identifying zero or more images based on the analyzing; and providing the identified zero or more images to the first user in response to the query.

In another aspect, disclosed herein are computer-implemented systems comprising: a digital processing device comprising an operating system configured to perform executable instructions and a memory; a computer program including instructions executable by the digital processing device to create a media sharing application comprising: a software module configured to receive, a first set of metadata from a first device associated with a first user and a second set of metadata from a second device associated with a second user, wherein: the first set of metadata is associated with a first image stored on the first device, and includes location information and time information for the first image, wherein the second set of metadata is associated with a second image stored on the second device, and includes location information and time information for the second image; a software module configured to identify a first event based on the first set of metadata and the second set of metadata, wherein the first event has a defined beginning time and a defined end time; a software module configured to associate the first image and the second image with the first event based on the location information or the time information associated with the first image and the second image; a software module configured to identify a relationship between the first user and the second user; and a software module configured to send a notification to the first user that the second user has an image associated with the first event. In some embodiments, the system further comprises: a software module configured to receive a first set of contacts information from the first device and a second set of contacts information from the second device; and a software module configured to compare the first set of contacts information with the second set of contacts information to identify a match, wherein the relationship between the first user and the second user is identified based on the match. In some embodiments, the first device stores a plurality of images, the system further comprises: a software module configured to associate a portion of the plurality of images with the first event on the first device. In some embodiments, the system further comprises: a software module configured to create the first event using at least one of the first set of metadata and the second set of metadata. In some embodiments, the system further comprises: a software module configured to analyze the first set of metadata and the second set of metadata; and a software module configured to infer information about the first user and the second user based on the analyzing. In some embodiments, the system further comprises: a software module configured to generate a recommendation for the first user or the second user based on the analysis. In some embodiments, the system further comprises: a software module configured to analyze location information included in the first set of metadata and the second set of metadata; and a software module configured to determine a radius of proximity for the first event based on the analysis. In some embodiments, the system further comprises: a software module configured to receive additional location-related information from an external source; and a software module configured to define properties of the first event using the additional information. In some embodiments, the system further comprises: a software module configured to receive additional sets of metadata from additional devices associated with additional users; a software module configured to receive sets of contacts information from the additional devices; a software module configured to receive a first set of contacts information from the first device; a software module configured to analyze the first set of contacts information, the additional sets of contacts information and the additional sets of metadata associated with each of the additional users; a software module configured to determine a plurality of users among the additional users who has at least one image associated with the first event; a software module configured to discover a subset of users among the plurality of users whose contact information is included in the first set of contacts information; and a software module configured to inform the first user about the determined subset of users. In some embodiments, the system further comprises: a software module configured to receive a third set of metadata from the first device, wherein the third set of metadata is associated with a third image stored on the first device, and includes location information and time information for the third image; a software module configured to compare the location information and time information for the third image to the location and time information of the first image or the second image; a software module configured to determine that the location information and time information for the third image is different from the location and time information of the first image or the second image; a software module configured to create a second event based on the third set of metadata, wherein the second event has a defined beginning time and a defined end time that is different than the first event; and a software module configured to associate the third image with the second event instead of the first event based on the location information or the time information associated with the third image. In further embodiments, the system further comprises a software module configured to close the first event. In some embodiments, the system further comprises: a software module configured to merge the first event and the second event into a merged event, wherein: a beginning time of the merged event is equal to or before than the beginning times of both the first event and the second event, and an end time of the merged event is equal to or after than the end times of both the first event and the second event. In some embodiments, the system further comprises: a software module configured to receive an instruction from the first user to share the first image with the second user; and a software module configured to make the first image available to the second user. In some embodiments, the first device stores a plurality of images and the system further comprises: a software module configured to receive a query from the first user to identify one or more images on the first device that belongs to a given event; a software module configured to analyze sets of metadata associated with the plurality of images; a software module configured to identify zero or more images based on the analyzing; and a software module configured to provide the identified zero or more images to the first user in response to the query.

In another aspect, disclosed herein are computer-implemented systems comprising: a digital processing device comprising an operating system configured to perform executable instructions and a memory; a computer program including instructions executable by the digital processing device to create a media sharing application comprising: a software module configured to generate an event by analyzing metadata associated with a plurality of media stored on a mobile device of a first user, the metadata comprising date, time, and location of the creation of each media; a software module configured to generate a collection by identifying a second user having stored on their mobile device at least one media associated with the event; a software module configured to suggest sharing, by the first user, media associated with the collection, to the second user, based on a symmetrical relationship between the first user and the second user; and a software module configured to present an album to each user, each album comprising media associated with the collection and either shared with the user or created by the user. In some embodiments, the media is one or more photos or one or more videos. In some embodiments, the event is classified as an intraday event or an interday event, the classification based on distance of the location of the creation of each media to a home location. In some embodiments, the symmetrical relationship is identified from mutual inclusion in contacts, two-way exchange of email, two-way exchange of text or instant message, or a combination thereof. In some embodiments, the application further comprises a software module configured to present a notification stream to each user, the notification stream providing updates on albums presented to the user.

In another aspect, disclosed herein are non-transitory computer-readable storage media encoded with a computer program including instructions executable by a processor to create a media sharing application comprising: a software module configured to generate an event by analyzing metadata associated with a plurality of media stored on a mobile device of a first user, the metadata comprising date, time, and location of the creation of each media; a software module configured to generate a collection by identifying a second user having stored on their mobile device at least one media associated with the event; a software module configured to suggest sharing, by the first user, media associated with the collection, to the second user, based on a symmetrical relationship between the first user and the second user; and a software module configured to present an album to each user, each album comprising media associated with the collection and either shared with the user or created by the user. In some embodiments, the media is one or more photos or one or more videos. In some embodiments, the event is classified as an intraday event or an interday event, the classification based on distance of the location of the creation of each media to a home location. In some embodiments, the symmetrical relationship is identified from mutual inclusion in contacts, two-way exchange of email, two-way exchange of text or instant message, or a combination thereof. In some embodiments, the application further comprises a software module configured to present a notification stream to each user, the notification stream providing updates on albums presented to the user.

DETAILED DESCRIPTION OF THE INVENTION

Figure 1:
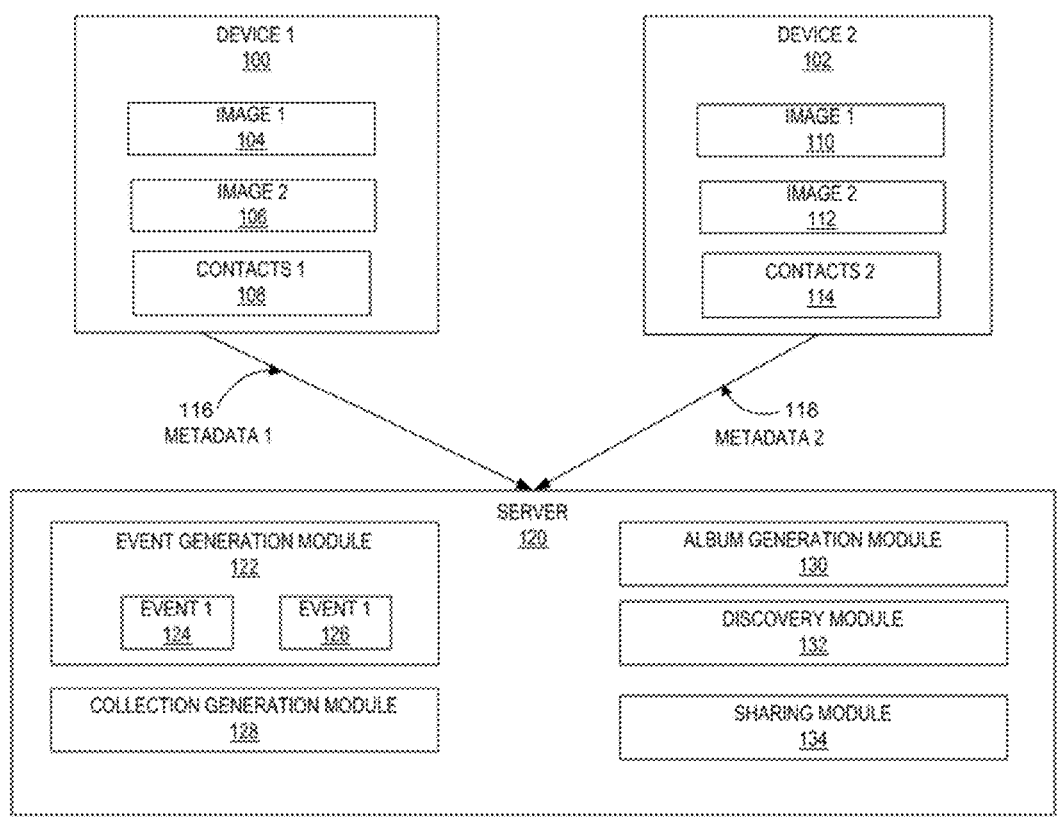
FIG. 1 illustrates a block diagram of an exemplary system to perform the steps discussed in connection with various embodiments of the present invention.

Consider one data point that highlights the shortcomings of today's photo sharing tools: greater than 90% of today's pictures that are taken are "lost" as not shared or uploaded (and lost with them, aside from sentimental value, is a great amount of potentially valuable data). There are many reasons for this. For instance, it is cumbersome to share photos from a certain event or general circumstance with others who also took part in those moments; current solutions require pre-inviting others to join group albums or creating static lists and/or circles. There is no way to do this automatically, specifically for each situation and in the background. Requesting others to share photos after the event is often an irritating request for all parties and the multitude of work-around solutions means most photos are not shared before they are superseded by new photos. Current sharing is also primarily one-to-one and it is difficult to organize photos such that there is currently no easy way to see a complete album of an event or moment in time that has been shared with others. This also means that it is also difficult for someone to see photos of themselves; 70% of pictures taken are of someone else. Further, current systems do not utilize phonebook connections to determine the strength of relationships.

Today's online storage, social, and messaging systems do not focus on reliving moments. Rather, they focus on workflow automation and content distribution. But people generally do not want to have to actively share content—they want to simply create and consume it. The present disclosure teaches novel ways to meet these desires and to ensure that far fewer photographs are "lost" due to the shortcomings of today's photo management and sharing solutions.

Described herein, in certain embodiments, are methods for grouping a plurality of images from a plurality of users into an event, the method comprising: receiving, at a computing system, a first set of metadata from a first device associated with a first user and a second set of metadata from a second device associated with a second user, wherein: the first set of metadata is associated with a first image stored on the first device, and includes location information and time information for the first image, the second set of metadata is associated with a second image stored on the second device, and includes location information and time information for second first image; identifying, by the computing device, a first event based on the first set of metadata and the second set of metadata, wherein the first event has a defined beginning time and a defined end time; associating, by the computing device, the first image and the second image with the first event based on the location information or the time information associated with the first image and the second image; identifying, by the computing device, a relationship between the first user and the second user; and sending, by the computing device, a notification to the first user that the second user has an image associated with the first event.

Also described herein, in certain embodiments, are computer-implemented systems comprising: a digital processing device comprising an operating system configured to perform executable instructions and a memory; a computer program including instructions executable by the digital processing device to create a media sharing application comprising: a software module configured to receive, a first set of metadata from a first device associated with a first user and a second set of metadata from a second device associated with a second user, wherein: the first set of metadata is associated with a first image stored on the first device, and includes location information and time information for the first image, wherein the second set of metadata is associated with a second image stored on the second device, and includes location information and time information for the second image; a software module configured to identify a first event based on the first set of metadata and the second set of metadata, wherein the first event has a defined beginning time and a defined end time; a software module configured to associate the first image and the second image with the first event based on the location information or the time information associated with the first image and the second image; a software module configured to identify a relationship between the first user and the second user; and a software module configured to send a notification to the first user that the second user has an image associated with the first event.

Also described herein, in certain embodiments, are computer-implemented systems comprising: a digital processing device comprising an operating system configured to perform executable instructions and a memory; a computer program including instructions executable by the digital processing device to create a media sharing application comprising: a software module configured to generate an event by analyzing metadata associated with a plurality of media stored on a mobile device of a first user, the metadata comprising date, time, and location of the creation of each media; a software module configured to generate a collection by identifying a second user having stored on their mobile device at least one media associated with the event; a software module configured to suggest sharing, by the first user, media associated with the collection, to the second user, based on a symmetrical relationship between the first user and the second user; and a software module configured to present an album to each user, each album comprising media associated with the collection and either shared with the user or created by the user.

Also described herein, in certain embodiments, are non-transitory computer-readable storage media encoded with a computer program including instructions executable by a processor to create a media sharing application comprising: a software module configured to generate an event by analyzing metadata associated with a plurality of media stored on a mobile device of a first user, the metadata comprising date, time, and location of the creation of each media; a software module configured to generate a collection by identifying a second user having stored on their mobile device at least one media associated with the event; a software module configured to suggest sharing, by the first user, media associated with the collection, to the second user, based on a symmetrical relationship between the first user and the second user; and a software module configured to present an album to each user, each album comprising media associated with the collection and either shared with the user or created by the user.

Certain Definitions

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

As used herein, "event" refers to photos that were grouped because there were taken within a particular distance (e.g., one hundred meters) of one another at a similar time. The difference in time and distance to determine an event may be changed based on the location of the user and the history of user activities.

As used herein, "collection" refers to a subset of photos that belong to an event that were grouped because they were taken within a particular distance (e.g., one hundred meters) of one another at a similar time and the users who took the photos had a reciprocal relationship (e.g., had the other users' phone number stored in their respective phone books). In some embodiments, the collection is a virtual construct and not visible to users.

As used herein, "album" refers to a subset of photos that belong to a collection, are grouped by location and time, and solely owned by the user who took those photos or had those photos shared with them.

Overview

In some embodiments, disclosed herein is a way of using metadata in photos to group, suggest what's relevant to an event and relevant invitees basis their photos and/or geolocation tracked in the app.

The present disclosure describes systems that work together to allow users to discover unseen photos taken by their friends and family. Through discovery the systems then allow users to see photos in a single album from a particular moment in time (historically from the first photo). Albums of these moments are grouped into Days or Trips. Albums can also be shared with users who were not present so that they can also see the photos and participate in the social communication (chat, comment, and like). To encourage more sharing, the systems generate memories for users to remind them of moments that are worth sharing. The systems also organize albums into days or trips depending if the photos were taken in the user's home location. The systems will also provide interaction with events such as music festivals asking a user if they would like to submit photos for prizes when they enter the geo fence for the event, they could upload automatically or when they leave, when leaving the systems would present only the photos taken at the event. The systems also let users see photos from events, after they install the application, even if they have not taken photos but have enabled auto check-in.

The present disclosure describes systems and methods for curating and consuming photographs and information derived from photographs (hereinafter, for convenience, referred to as "Shoto"). Shoto gives users new ways to discover, organize and share photos taken privately with their friends, family, and others. Embodiments may comprise a system or method of contact mapping, phonebook hashing, harvesting of photo metadata and other techniques.

Shoto maps a user's contacts stored in the user's mobile device (the identifying information for these contacts may be phone numbers, Facebook user IDs, or other identifying information). Shoto performs a one-way encryption of the identifying information for the contacts stored in the user's mobile device. The result is hereinafter referred to as the user Identifiable Encryption Key (UIKY). The UIKY is sent to a server, where it is then compared to the UIKY received from other users' mobile devices.

Shoto identifies relationships between users when there are matches, and can categorize the relationships depending on the type of identifying information that is matched. For instance, Shoto identifies that User A's mobile device contains User B's phone number, and vice versa. Shoto may also identify that User A's mobile device contains User C's Facebook ID, and vice versa. Certain embodiments may weigh these identified relationships differently in determining the nature and proximity of the relationship between the users, e.g., a phone number match means the users are close, while only a Facebook ID match means the users are just acquaintances.

Certain embodiments allow users to upload their photos to a server, where they may be stored. Uploading photos can be as easy, for instance, as tapping a plus symbol on any photo or tapping "Start Sharing". A "timeline" view shows all photos (whether taken with Shoto's native in-app camera or otherwise collected through Shoto). Photo uploading can easily be stopped or photos can be removed from Shoto (and thus only stored locally), for instance by tapping a symbol while the photos are uploading or briefly after they have been uploaded. In some embodiments, photos successfully uploaded are confirmed by a symbol displayed on the screen. Even uploaded photos can be removed from everyone else's phone by marking them as unshared.

In addition to contact mapping and phonebook hashing, certain embodiments also harvest metadata (EXIF) from the user's photos (hereinafter referred to as "Photo Metadata"). Photos do not necessarily need to be uploaded in order for Photo Metadata to be harvested from them. Photo Metadata may include, but is not necessarily limited to, latitude, longitude, time, rotation of photo and date of the photo. In some embodiments, ambient noise captured before, during or after the photo being taken is also included as Photo Metadata. Photo Metadata can be harvested from photos in the user's mobile device storage, cloud storage (e.g., DropBox, etc.), social networks (e.g., Facebook albums, etc.), and other locations. Photo Metadata is sent along with the UIKY to a server, where the Photo Metadata and UIKY are compared to the Photo Metadata and UIKY received from other users' mobile devices. The comparison of this data yields not only relationships between users, but also events or moments that the users likely shared (given similar photo metadata), as well as other useful information.

Certain embodiments allow the user to adjust overall app settings, for instance auto-syncing photos, local photo storage, connectivity with third party applications or third-party services, etc.

Referring to FIG. 1 when images are taken on two devices (100, 102), the metadata from each device is sent to the server. When the image reaches the server 120, the system looks to see if the photo belongs an event. In this case, the photos do not belong to an existing event, and so the metadata is dropped into an event generation module 122. The system creates a new event to accommodate the photo and then puts the photo into that event. After the event is created, and it is seen that the photos belong to the same event, a collection generation module 128 is created to identify a relationship between the two devices. If each user has the other in their phonebook, then a relationship is established and a collection is created. If each of the users takes multiple photos on their respective devices, those photos can then be grouped into albums on the user's device, through the album generation module 130. After the album is created, the system then works with the metadata to identify photos from an album that might belong to an established collection. When photos in an album are identified to also be in a collection, the discovery module 132 is triggered. The discovery module builds a relationship between the photos in an album on a user's device with photos in another album on another user's device. The users can then share the photos that have been identified to be part of a common collection through the sharing module 134.

Onboarding

Figure 7:
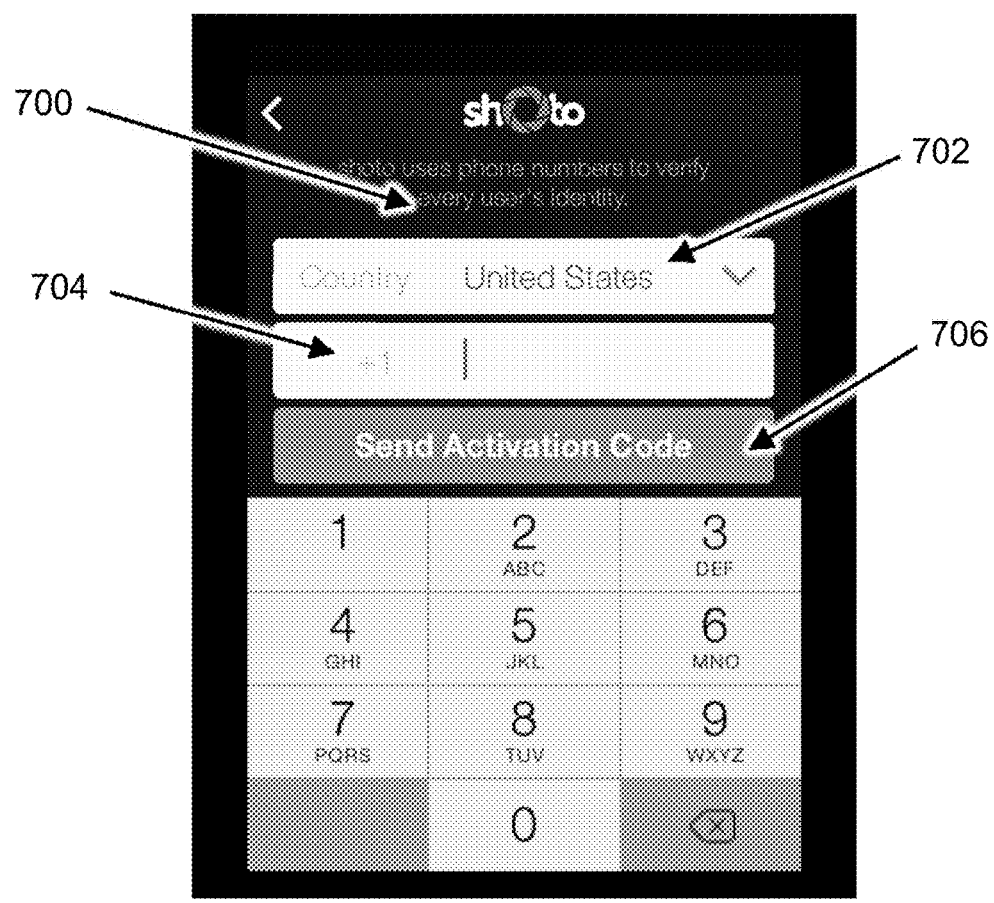
FIG. 7 depicts a non-limiting, exemplary mobile user interface; in this case, a user interface for inputting a number to which an activation code can be sent. When the user enters a phone number and then presses the button that says "Send Activation Code" the phone number the user inputted is sent a verification code via SMS.
Figure 8:
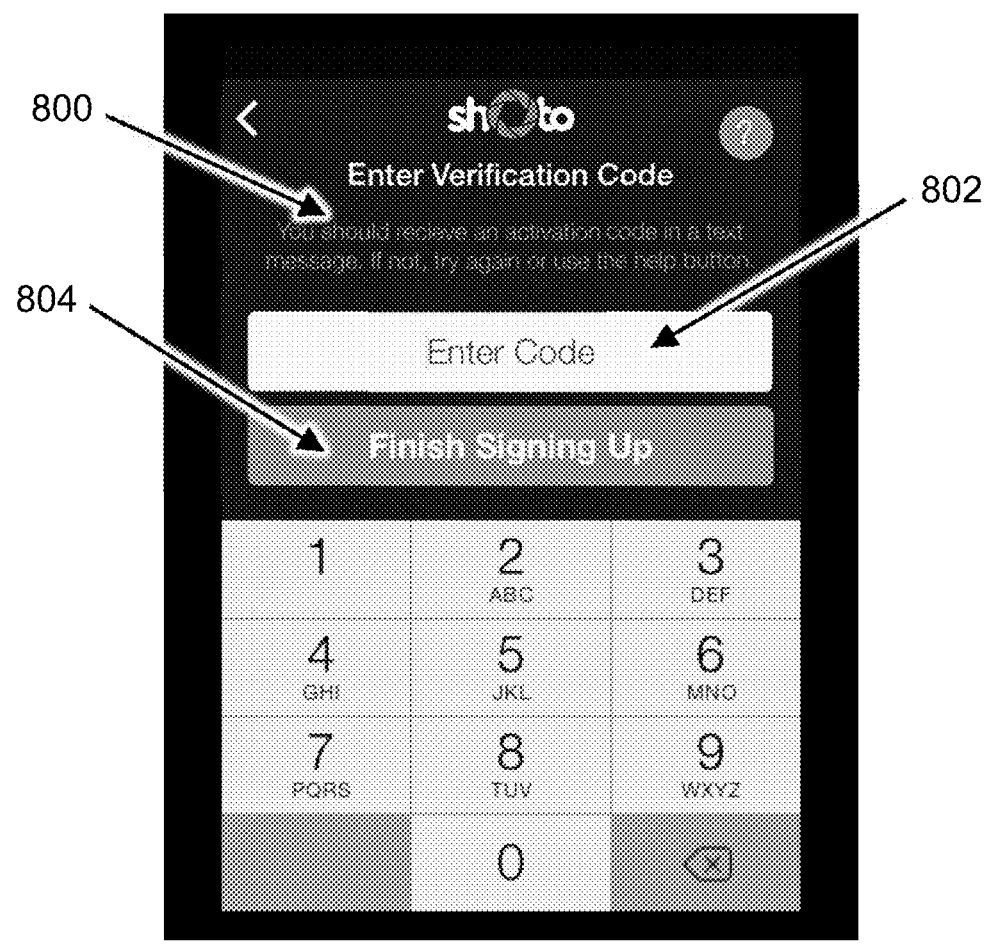
FIG. 8 depicts a non-limiting, exemplary mobile user interface; in this case, a user interface for entering the verification code that they were sent via SMS. When the user enters the correct verification code and presses the button that says "Complete Verification," they are taken to the next screen in onboarding.
Figure 9:
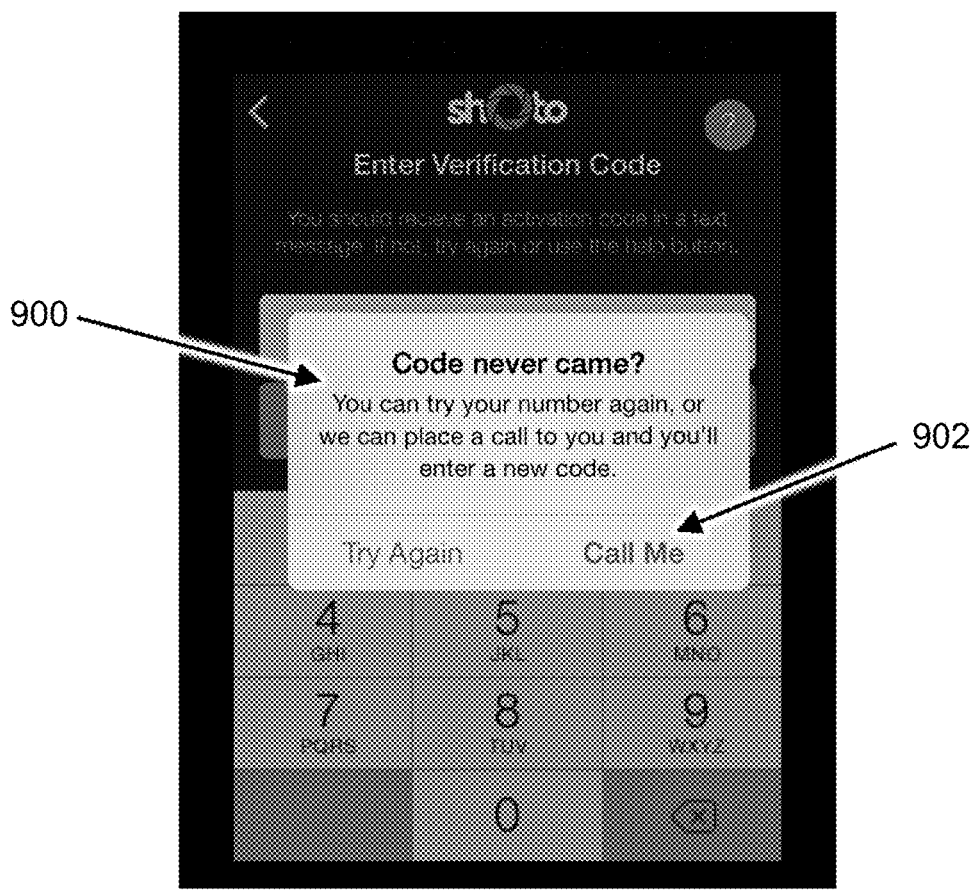
FIG. 9 depicts a non-limiting, exemplary mobile user interface; in this case, a user interface for presenting a modal the user will see in the event that the user does not enter a verification code within 30 seconds of it being sent. When the user presses the button "Try Again" another verification code will be sent to the user via SMS. When the user presses the button "Call Me" the user will be taken to a screen with the verification code.

Certain implementations of the present invention allow the user to verify their phone number through a verification code. The user selects a country to fill field 702. When the user enters a valid phone number in field 704 on screen 700, as illustrated in FIG. 7, and then clicks "Send Activation Code" 706, the user is sent an SMS with the verification code. Simultaneously, the user is taken to a third onboarding screen 800 in FIG. 8 on which they can enter their activation code. When the user enters the correct activation code in field 802 and then clicks "Finish Signing Up" 804, that user is verified.

Figure 42:
FIG. 42 depicts a non-limiting, exemplary mobile user interface; in this case a user interface for a help screen with a verification code for communication with Shoto staff.

There is a certain implementation of the present invention that calls the user with a verification code in the event that an activation code is not received via SMS. When the user does not enter a verification code into field 802 within 30 seconds of the SMS being sent, the user will see modal 900. When the user clicks "Call Me" 902, the user is taken to a help screen, such as depicted in FIG. 42, 4200, where they will see a verification code. Simultaneously, the user will receive a phone call from Shoto thanking them for downloading the app. When the user clicks the back button, they should be taken back to onboarding screen 800. When the user enters the correct verification code in field 802 and then clicks "Finish Signing Up" 804, that user is verified.

Figure 10:
FIG. 10 depicts a non-limiting, exemplary mobile user interface; in this case, a user interface for presenting a modal the user will see in the event that the user does not have any friends on Shoto. When the user presses the button labeled "Invite" they will be taken to a list of contacts from their address book on Shoto. The user can then invite contacts from this list to download Shoto.

There is a certain implementation that prompts the user to allow Shoto access to their Contacts. In FIG. 10, an onboarding screen 1000 provides a route for the user to allow Shoto to access their contacts. When the user clicks "Allow Access to Contacts" 1004, Shoto is allowed access to the user's Contacts. If the user has no friends on Shoto, the user will see modal 1000. When the user clicks "Invite" 1002, the user will see a list of their contacts not on Shoto, as seen on screen 1200. When the user clicks on "Send Invite" 1202, a SMS will be sent to the selected contact with a link to download Shoto. When more than one contact is selected to be invited, the SMS with the link will be sent as a group SMS.

Figure 11:
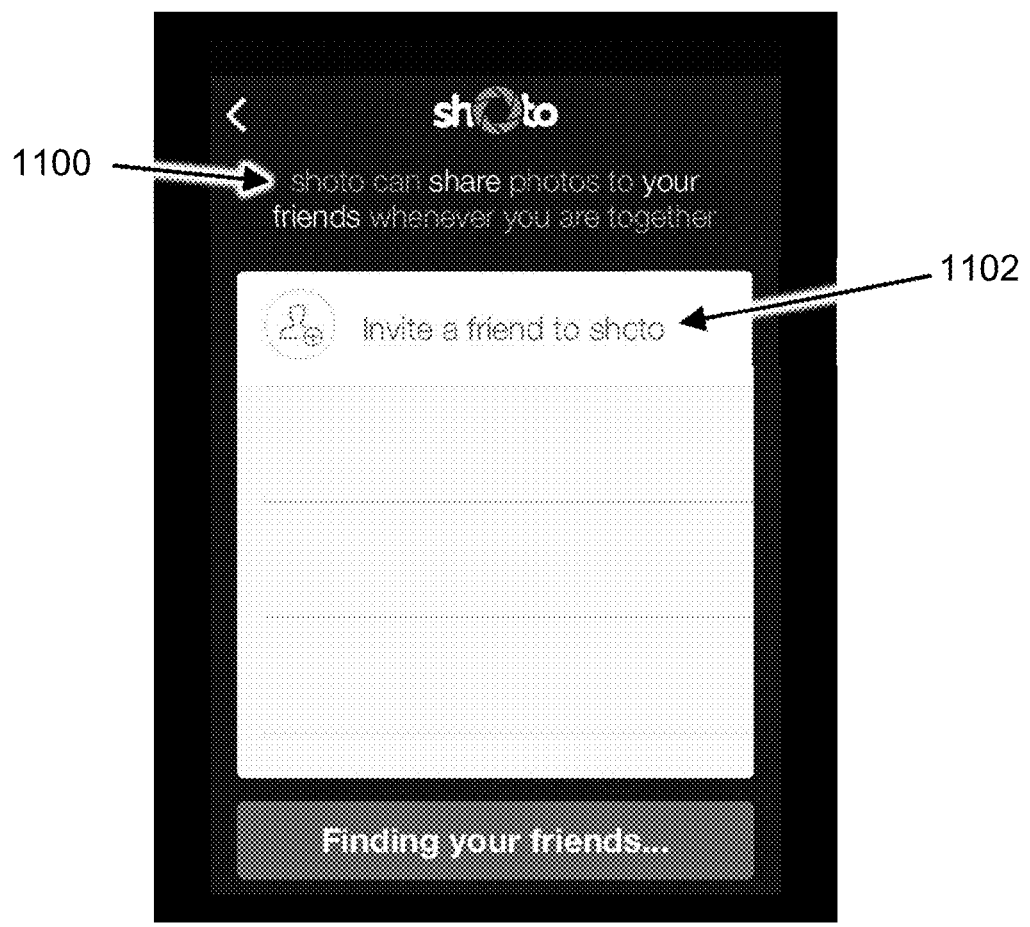
FIG. 11 depicts a non-limiting, exemplary mobile user interface; in this case, a user interface for inviting contacts from the user's address book to download Shoto. When the user presses the placeholder avatar labeled "Invite a friend to Shoto", they will be taken to a list of contacts from their address book on Shoto. The user can then invite contacts from this list to download Shoto.
Figure 12:
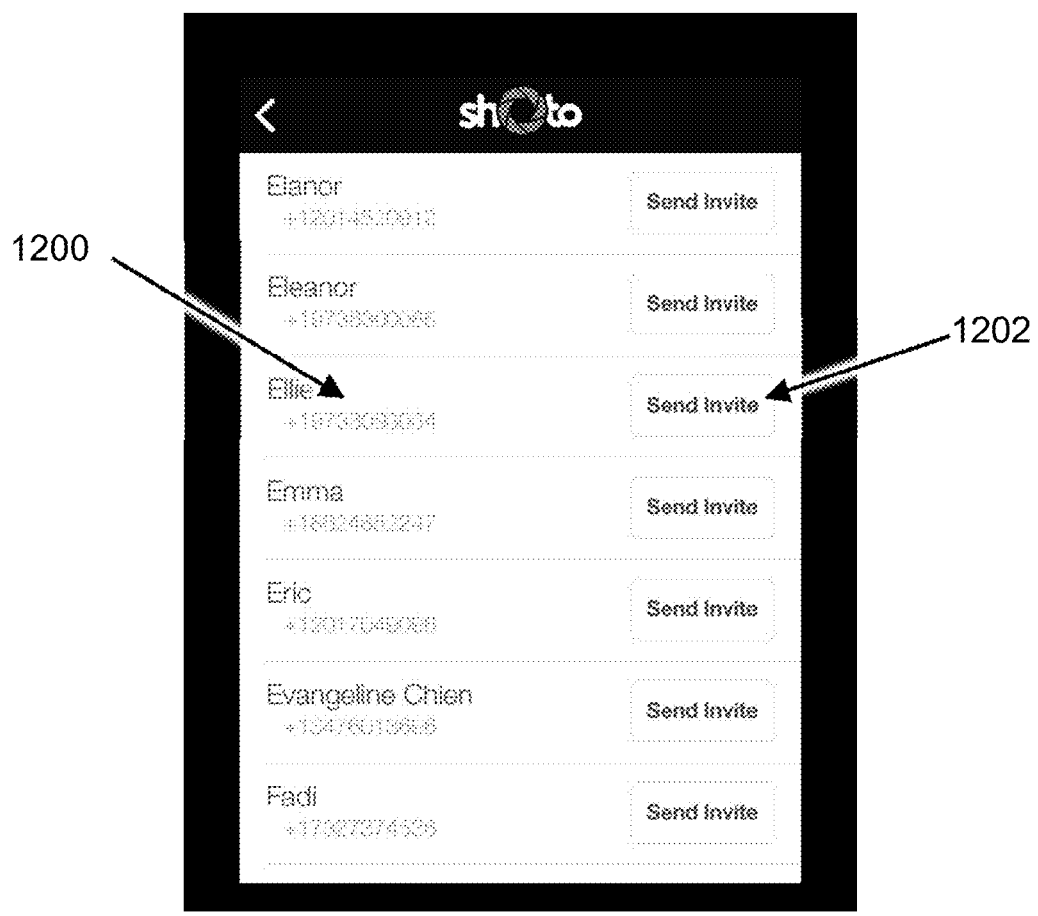
FIG. 12 depicts a non-limiting, exemplary mobile user interface; in this case, a user interface for inviting contacts from the user's address book to download Shoto. When the user presses the button that says "Send Invite" beside the user's name, an SMS will be loaded with a link to download Shoto. When the user sends the SMS, the contact will be sent the link.

Some implementations of the present invention allow the user to invite contacts from their address book to Shoto. In FIG. 11 an onboarding screen 1100 shows contacts from the address book of users who have downloaded Shoto and a placeholder contact. When the user clicks on "Invite a friend to Shoto" 1102, the user will see a list of their contacts not on Shoto, as seen on screen 1200.

Determining an Event

The first photo(s) is analyzed by the server, depending on a number of factors that include but are not limited to the type of place, the day of week, density of location, history of merges made at that particular longitude and latitude (a merge is a manual user interaction of merging) and any public data about an event happening at a particular place. A geo fence, radius, average distance between clusters of photos, and average time between clusters are amongst some of the attributes generated.

Any of the methods described herein may be totally or partially performed with a computer system including one or more processors, which can be configured to perform the steps. Thus, embodiments are directed to computer systems configured to perform the steps of any of the methods described herein, potentially with different components performing a respective step or a respective group of steps. Although presented as numbered steps, steps of methods herein can be performed at a same time or in a different order. Additionally, portions of these steps may be used with portions of other steps from other methods. Also, all or portions of a step may be optional. Any of the steps of any of the methods can be performed with modules, circuits, or other means for performing these steps.

Figure 2:
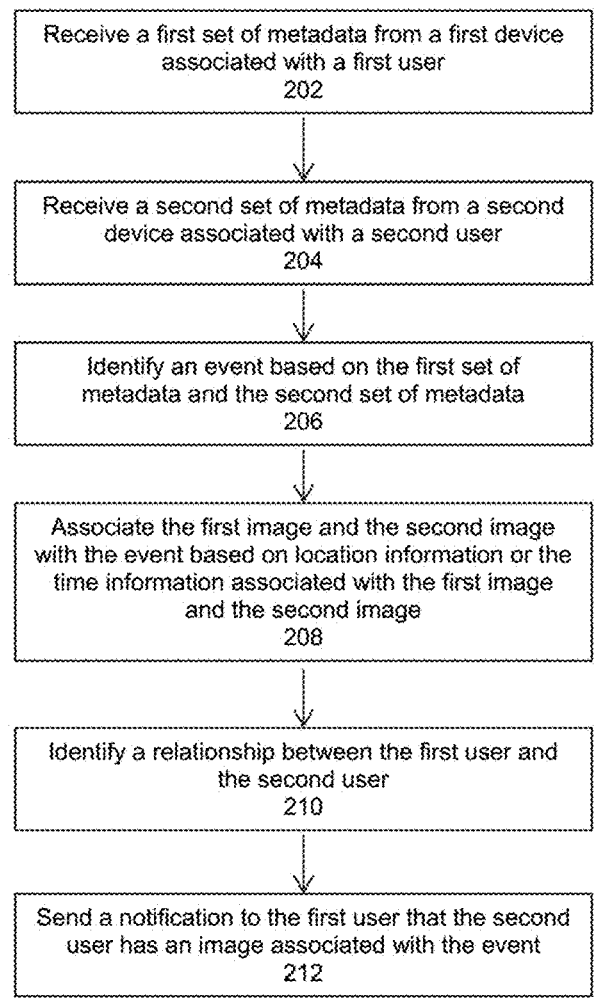
FIG. 2 illustrates a flowchart of exemplary steps for associating two images with an event, according to an exemplary embodiment of the present invention.

Referring to FIG. 2, certain embodiments of the present invention allow for one user to be notified when another user has an image associated with a common event. When the first user takes a picture, the metadata associated with that photo is sent to the server from the first user's device 202. When the second user takes a picture the metadata associated with that photo is sent to the server from the second user's device 204. Using the combined metadata from the first and second users' devices, an event is identified 206. After an event has been identified, the metadata is then used to associate the images with the event. Specifically, the time and location the photo was taken are used to associate the images with the event 208. After it is established that the photos are associated with the event, the system looks to identify a relationship between the first and second user 210. If each user has the other as a friend on Shoto, or a contact in each other's phone books, a relationship will be established, and the first user will be notified that the second user has an image associated with the event 212.

Adding a Photo to an Existing Event or Creating a New Event

An algorithm that can include machine learning elements applies these attributes to existing labels of events (examples such as concerts, brunch, walk in park, road trip) and then groups the photos into the event. Depending on the algorithm, if a photo falls outside any number of attributes, those photos may get moved into a new event.

Figure 3:
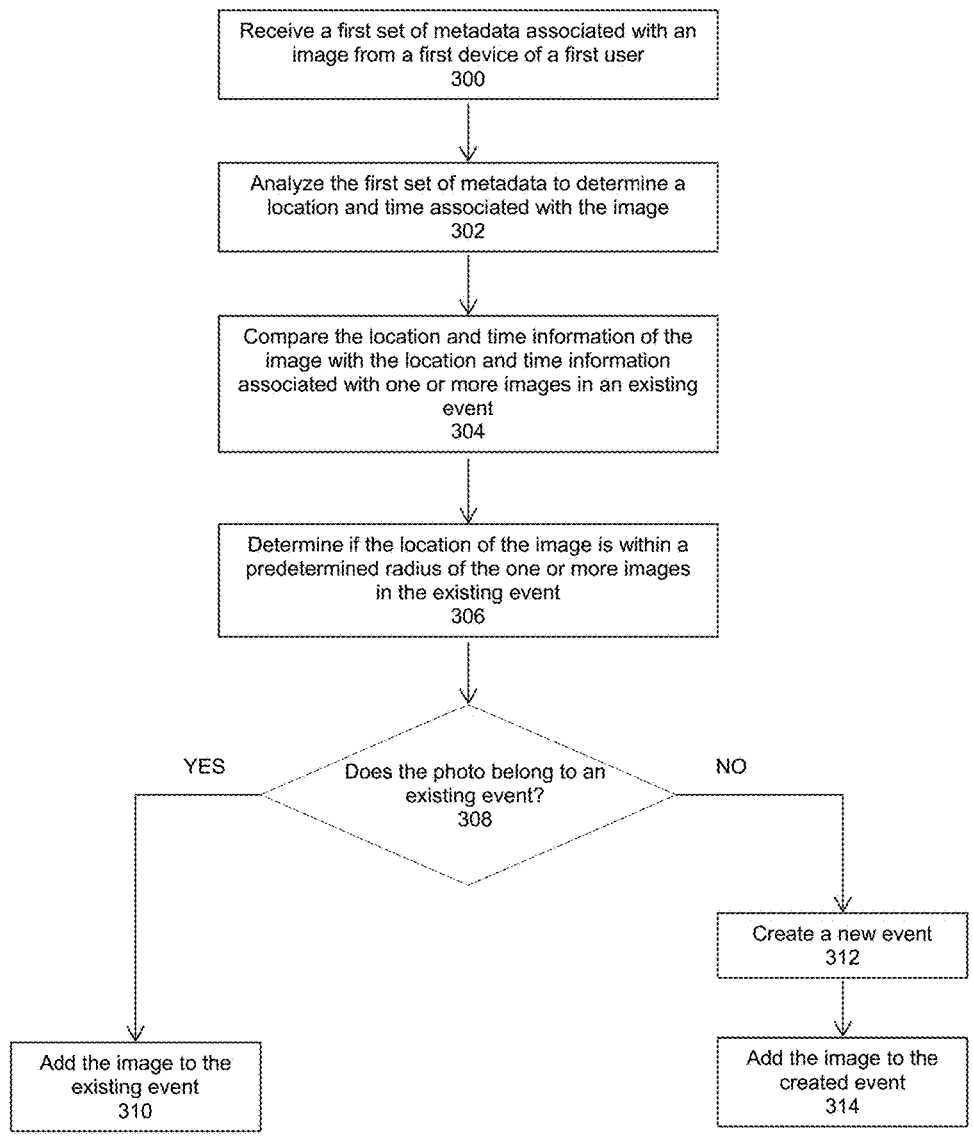
FIG. 3 illustrates a flowchart of exemplary steps for associating an image with an existing or new event, according to an exemplary embodiment of the present invention.

Referring to FIG. 3, metadata can be used to determine if an event already exists or if an event needs to be created in order for a relationship between users to be identified. When a first user takes a photo, the metadata associated with that photo is sent from the device to server 300. When the metadata reaches the server it is analyzed to determine a location and time that can be associated with the image 302. Using the identified location and time image, the system looks for other images with similar location and times to see if the photo taken belongs to an existing event 304. Part of the process that determines whether a photo belongs to an existing event includes determining if the taken photo falls within a predetermined radius of one or more images in an existing event 306. If the photo belongs to an event, the photo is added to the existing event 310. If the photo does not belong to an event, an event is created to accommodate the photo 312, and the photo is added to the newly created event 314.

Manually Creating an Event

Figure 13:
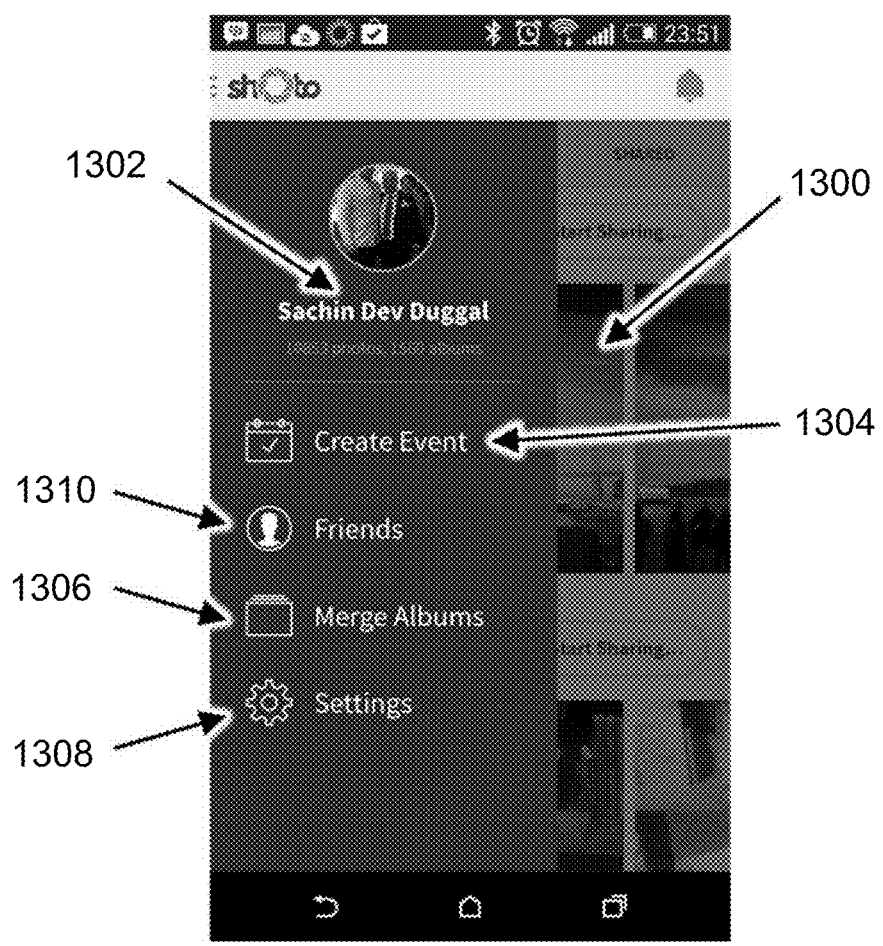
FIG. 13 depicts a non-limiting, exemplary mobile user interface; in this case, a user interface for presenting the slide out menu the user will see when they press on the three bars in the upper left hand corner of the timeline screen. The user will be able to change their avatar, create an event, view their friends list, merge albums, and access app settings from the slide out menu.
Figure 14:
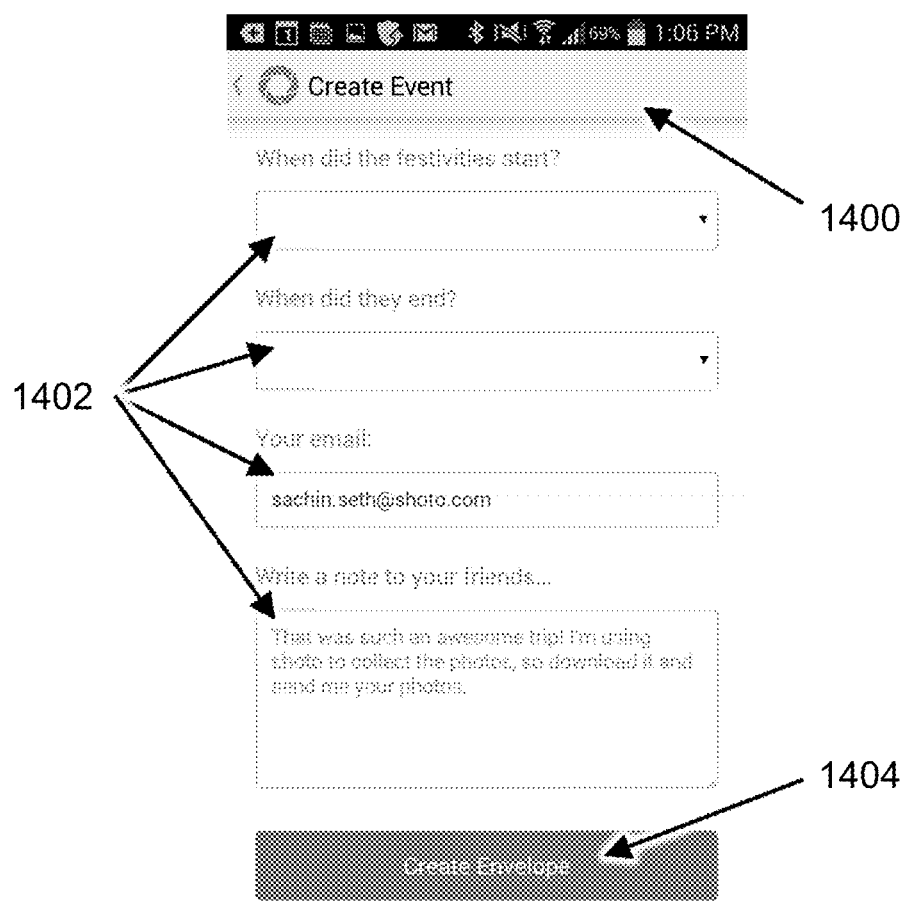
FIG. 14 depicts a non-limiting, exemplary mobile user interface; in this case, a user interface for creating an event. The user must input a name for the event; the event location; the time the event started and ended; their email; and a message to recipients of the event invite, in order to create an event. When the user fills in all the fields and presses on the button labeled "Create Event" the event will be created.

There are certain implementations that allow the user to create an event. In FIG. 13, screen 1300 exposes a slide out menu 1302. When the user clicks on "Create Event" 1304, the user will be able to fill in the empty fields 1402 as seen in screen 1400, illustrated in FIG. 14. When the user has filled in the fields and clicks on "Create Envelope" 1404, the event will be created.

The manually created album creates a link that can be sent to friends. When friends visit the link they are asked to enter their phone number (or open in app if they are on their mobile phone that has the app). When they enter their number, Shoto sends them a download link. Once they signup from that download link Shoto presents relevant photos to the event that they could submit during onboarding. Once the user agrees, the user will get to the timeline and the event host will get the photos.

Determining a Collection

Collections are super sets of photographs that have been grouped together based on location, time, and type of location. They include photos that belong to anyone who knows anyone else at the event. By way of example, everyone on a day trip that knew someone else who was there who is using Shoto and has taken photos would have their photos' metadata belonging to a collection.

Figure 4:
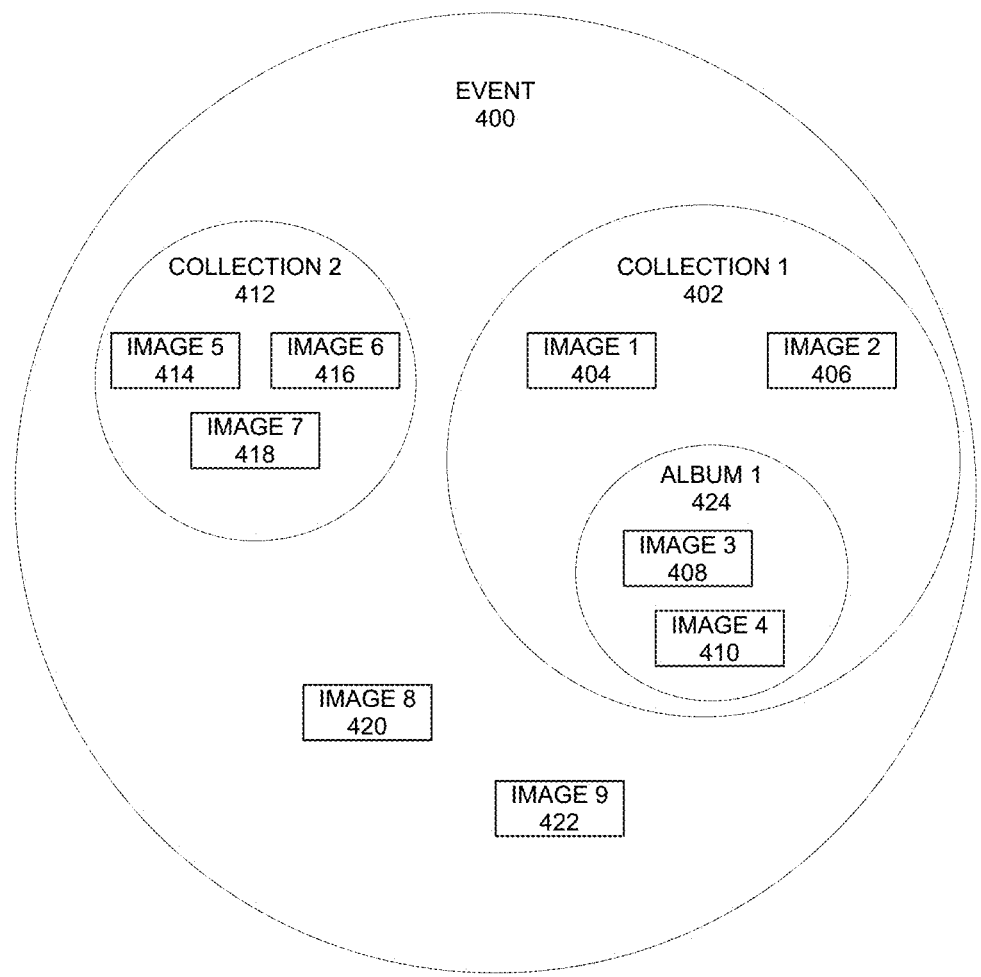
FIG. 4 illustrates an exemplary event, a plurality of exemplary collections within the event and an exemplary album within one of the collections in connection with various embodiments of the present invention.

Referring to FIG. 4, in a particular non-limiting embodiment, images (408, 410) can be grouped into album 424. The user's photos are the only photos that can end up in their album. Other user's photos will not appear in the user's album, however, can appear in the user's collection 402. Images that appear in the user's collection, but do not appear in the user's album (404, 406), are single images that belong to other users. Those images belong to other users who are in the user's phone book, which is why the images appear in the user's collection. A collection does not necessarily have to include an album, such as collection 412. Images can exist in a collection, without belonging to an album (414, 416, 418). Images can also belong to an event, and not to a collection (420, 422). The metadata associated with images 420 and 422, tells the system that there are no other Shoto users who belong to the event, with whom a relationship can be built with the user who uploaded either photo 420 or 422.

Albums

Albums are a particular user's view of a collection based on the symmetrical relationships a user has with those who are in the collection and any additional one-way relationships where the originator has sent the album to the user.

By way of example, a user is with five friends and three of their friends in Hyde Park. When five friends of the group take photos, they belong to the same album, collection, and event. The three others will not belong in the user's album until one of them sends the user the album. They won't belong in the user's album automatically because the user does not have their phone number in his contacts, but they may have the user's number in their contacts.

Discoverable Albums

Shoto has the ability to organize and build dynamic photo albums based on Photo Metadata and uses the UIKY to also populate additional photos into the SAME view and same Album.

In other words, Shoto infers context from Photo Metadata. For instance, an embodiment of Shoto could infer that a certain set of photographs taken by a user belong in a vacation album because the longitude and latitude of those photographs are located in a concentrated area away far from the user's home location and the dates of the photos show that they were taken over the course of a week.

Embodiments take into account certain radiuses of proximity (both in time and location) when inferring context from Photo Metadata. For example, Shoto may recognize that a group of photographs appear to have been taken in a certain restaurant, according to the latitude and longitude information in the Photo Metadata. Shoto can then infer that all pictures taken within a small radius of proximity to these latitude and longitudinal coordinates were taken at the restaurant. Shoto can use a larger radius of proximity for other situations, for instance where photos are taken in a sprawling national park. Additionally, Shoto analyses factors such as distance and time between clusters, historical photo taking behavior where available and uses machine learning to apply probability of existing modeled events to a particular grouping as described herein.

Shoto also uses public location sources such as (but not restricted to) FourSquare, Yahoo, Google, and WAYN to determine the type of location.

Embodiments can make similar inferences based on other types of collected data. For instance, Shoto can infer that a group of photographs belong together because of the time they were taken (e.g., all within a 3-hour window, or each within 30 minutes of the last). Some embodiments can also capture ambient noise when a photograph is taken, which can then be compared for grouping and sharing purposes with the ambient noise captured during other photographs. Certain embodiments can also perform a graphical analysis of the photographs (e.g., measuring the amount of light) to group and share them. In this vein, Shoto can similarly use the distance from Wi-Fi hotspots, compass position, or height of mobile device, among other things.

Shoto adjusts the time between pictures, distance between pictures and max timeout before album considered closed basis the location type which is sources from its services that include but are not limited to its own input, FourSquare, WAYN, and Yahoo.

Certain embodiments use facial recognition to make certain inferences, e.g., a certain user is present in a photograph. This technology makes it possible for Shoto to better organize user photos, as well as to give users more powerful discovery tools.

In order to speed up recognition location, the ShotoCloud uses on-demand processes that input locations around pictures taken. When a picture is taken in a new location ShotoCloud begins a process to ingest all possible location details within a set number of miles around the location—this allows Shoto to reduce the number of calls it makes to external service providers and also speeds up time to group photos (as a 3rd party call isn't required every time). Locations and Events are then loaded into platform high-speed memory to allow rapid access.

Certain embodiments allow users to adjust the settings for albums. In one embodiment, album settings show views, contributors, and other album-related settings (e.g., privacy) for the album. Albums can be merged into a single album, which can later be split into multiple albums, to better reflect the occasion or for other reasons.

Photo Sharing and Shared Albums

Shoto gives the user the capability to easily and intuitively manage photo permissions. In some embodiments, the Shoto app displays a circular "Slider" which can be manipulated by the user. For instance, the user can move the Slider to 90 degrees (clockwise from top) to set the permission of a photo or album of photos such that only that user can access the photo or album of photos. The user could also move the Slider to 180 degrees to set the permission of a photo or album of photos such that select other users (typically a subset of the user's friends, family, or other acquaintances) could also access the photo or album of photos. The user could also move the Slider to 270 degrees to set the permission of a photo or album of photos such that anyone could access the photo or album of photos. The user can move the Slider before photos are taken using Shoto's in-app camera for one-step privacy setting, and can also move the Slider to change privacy settings for individual photos and entire albums that have already been taken or are otherwise preexisting in the user's photo library.

Users have the ability to take pictures using Shoto's in-app camera. This means that with one click (a photograph may be taken by simply tapping once on the mobile device's screen), the user takes a photograph that may be automatically shared with the appropriate other users (or none at all). By eliminating the extra work (clicks and/or taps) involved with current solutions, users have the ability to share moments with other users nearly instantaneously. This auto-upload feature may be switched on and off, and may be set as a default to either setting, depending on the embodiment of Shoto.

In some embodiments, an in-app camera offers live-view filters (e.g., black & white, sepia, etc.) that display in real time to the user what the photo will look like when taken; the chosen filter will be applied automatically when the photo is taken. This eliminates the laborious process of applying filters to photos one-by-one after they are taken, which can be very time consuming with large sets of photographs.

Figure 22:
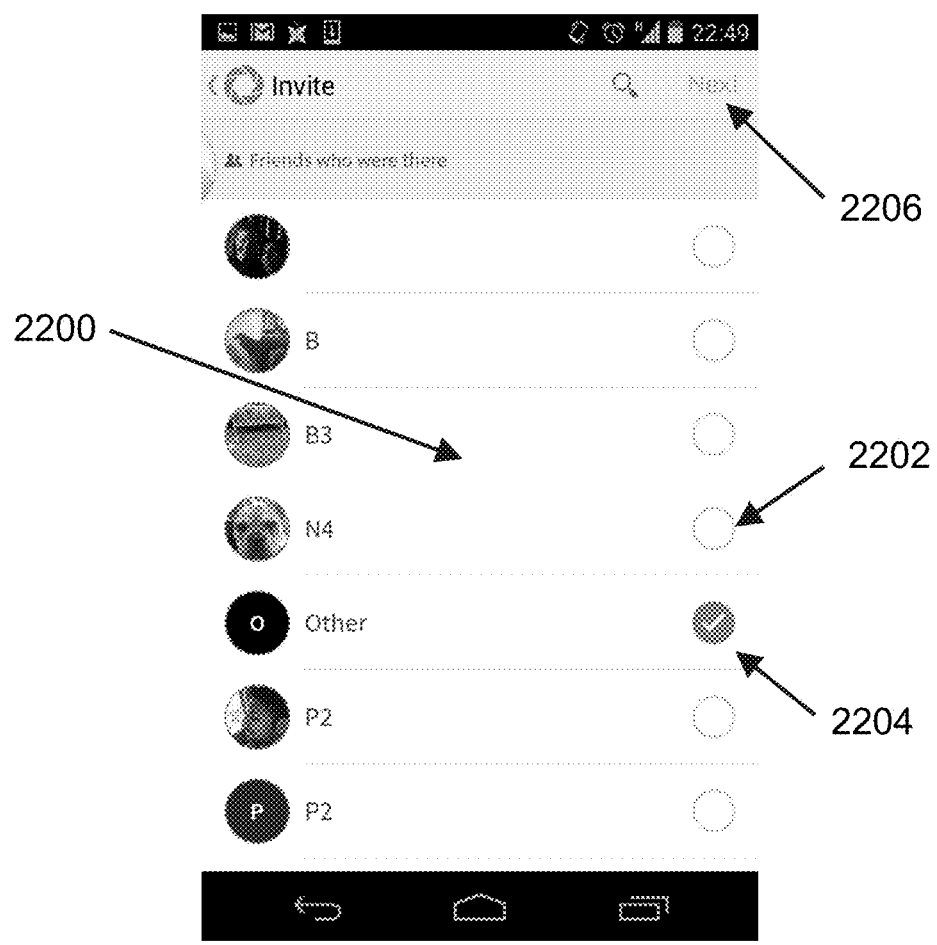
FIG. 22 depicts a non-limiting, exemplary mobile user interface; in this case, a user interface for presenting a screen the user will see if the user and the user's friends all have photos from a single memory, and the user chooses to start sharing their photos from the memory. The user will see "Friends who were there" ordered at the top of the list. When the user presses on the empty circle beside each friend's name, the circle will occupy with a check mark and the friend will be considered selected. The user can toggle the selected state of the friend by tapping on the circle. When the user presses on the magnifying glass at the top of the screen, they will activate a search function. As the user types in the name of the contacts they are looking for, they will be provided with suggestions of names. When the user clicks on the button that says "Next" they will be taken to a screen as seen in FIG. 23.
Figure 23:
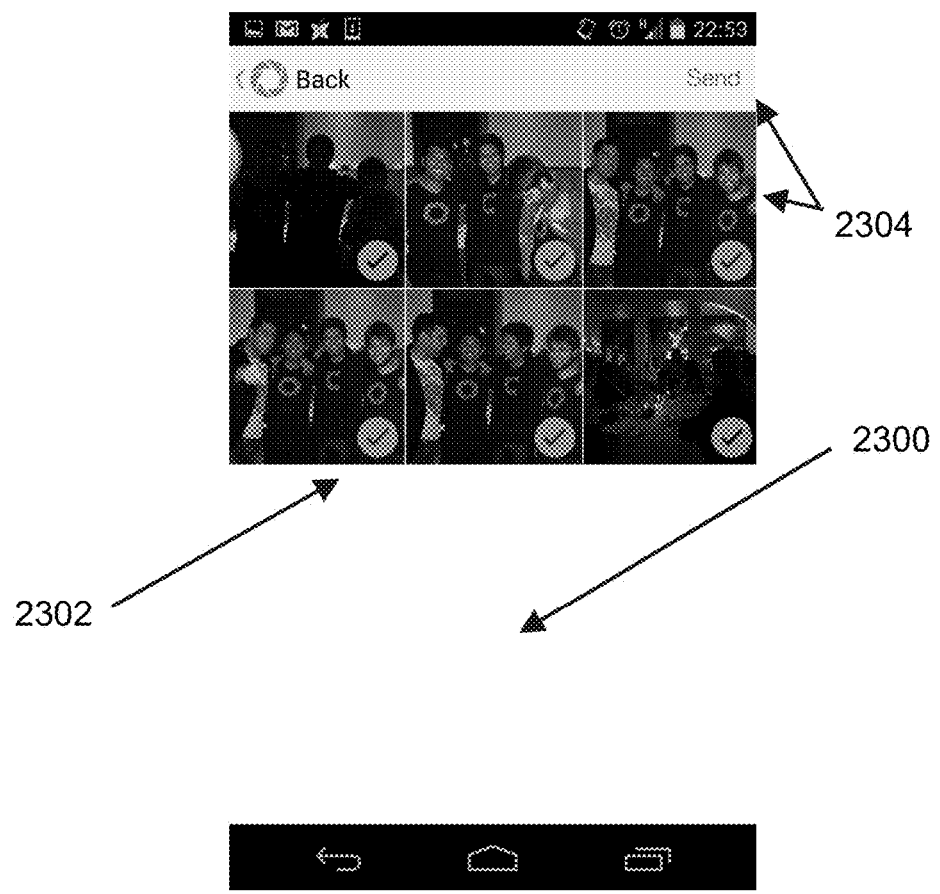
FIG. 23 depicts a non-limiting, exemplary mobile user interface; in this case, a user interface for presenting a screen the user will see after they are done selecting friends they want to share photos with. When the user taps on the preview of the photos they check mark on the photo will disappear and the photo will be considered unselected. The user can toggle the selected state of the photo by tapping on it. When the user presses on the button that says "Send," the selected photos will be shared with the selected users and the user will be taken to the timeline.
Figure 30:
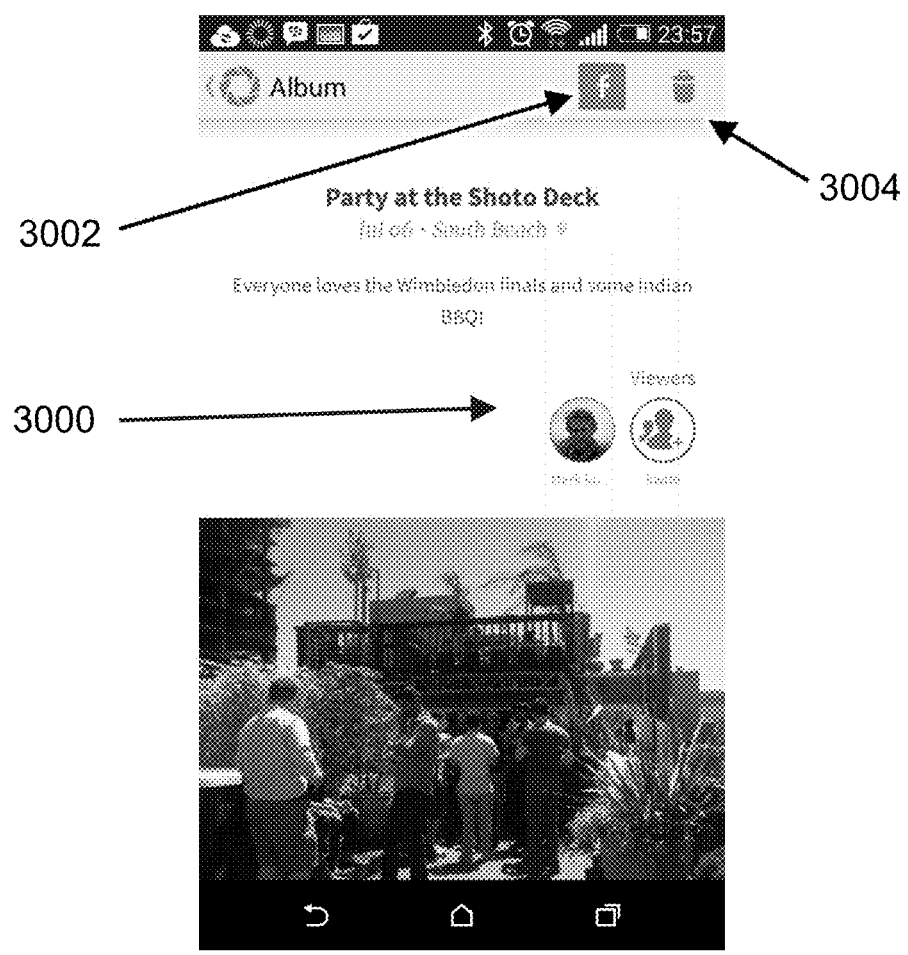
FIG. 30 depicts a non-limiting, exemplary mobile user interface; in this case a user interface for presenting a screen the user will see if they press on the preview of an album they have shared with other Shoto users. The screen shows the photos that belong to that album, in addition to the avatars of those users who can view the album.
Figure 31:
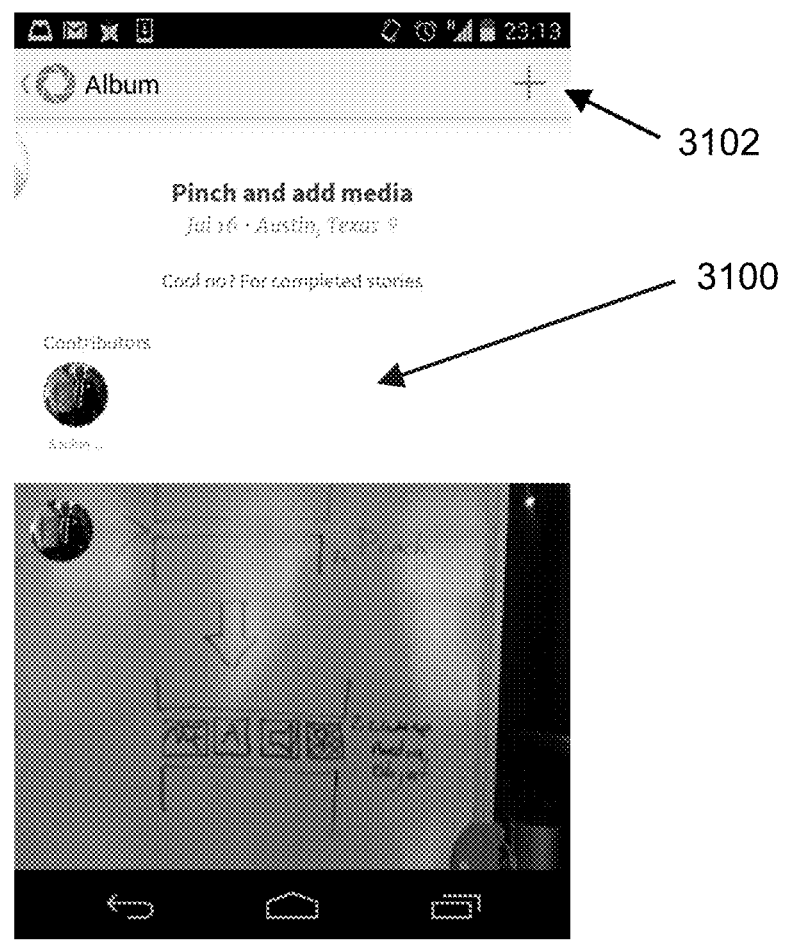
FIG. 31 depicts a non-limiting, exemplary mobile user interface; in this case a user interface for presenting a screen the user will see if they have been invited to view photos by another Shoto user. The screen shows the photos they have been invited to view, in addition to the avatars of users who have the ability to contribute photos to the album.

There are some implementations of the present invention that allow the user to share undiscovered moments with other users. When the user clicks on "Start Sharing Photos" 2102 the user will see a screen with a list of friends and contacts with whom they can share the memory, shown on screen 2200 in FIG. 22. When the user clicks on the box with the name of the friend/contact, the empty circle beside the name 2202 fills in with a check mark 2204. The friends who were there when the memory was created are ordered at the top of the list, preselected. When the user clicks "Next" 2206, they will see the photos that belong to the memory with a check mark in the bottom right hand corner of the photo 2302 indicating a selected state, displayed on screen 2300 in FIG. 23. When the user clicks "Send" 2304, the selected photos will be shared to those selected individuals. Selected users who were part of the undiscovered moment will see the selected photos in screen 3000 as illustrated in FIG. 30. Selected users who were not part of the undiscovered moment will see the selected photos in screen 3100 as illustrated in FIG. 31.

Figure 28:
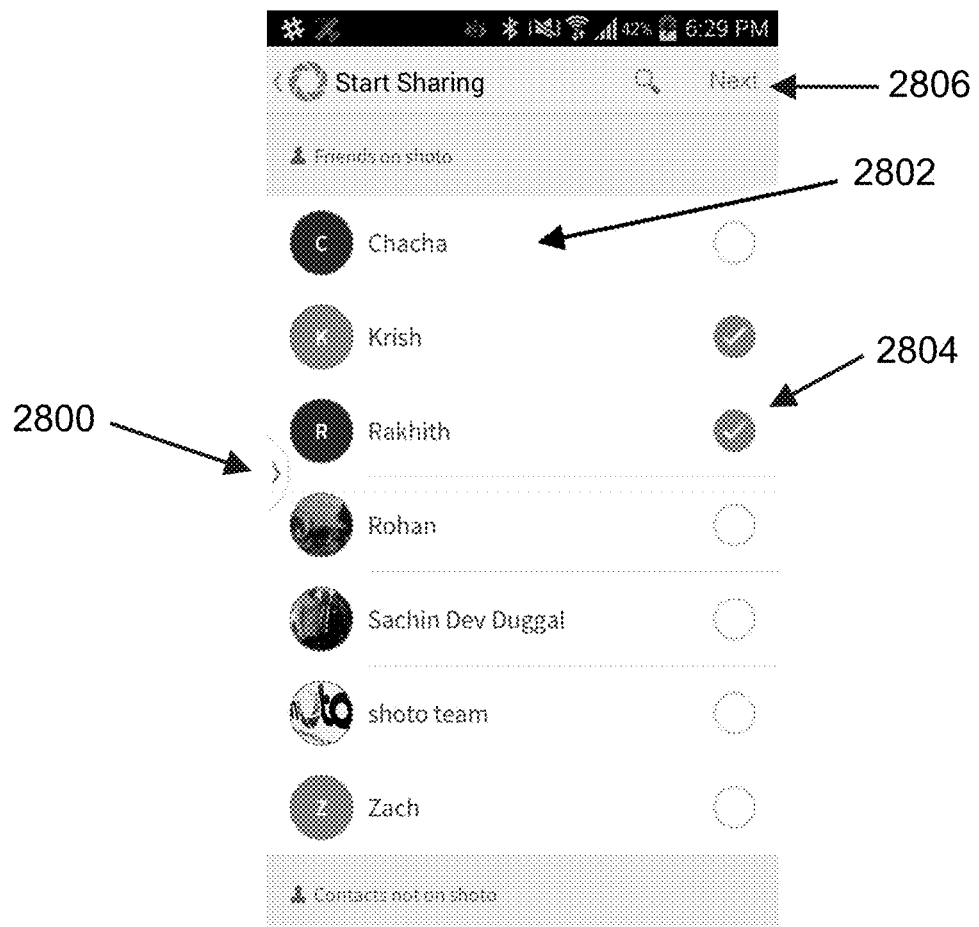
FIG. 28 depicts a non-limiting, exemplary mobile user interface; in this case a user interface for presenting a screen the user will only see if they attempt to share photos that were not taken in the vicinity of other Shoto users. The screen shows a list of friends who are also on Shoto, in addition to contacts from the user's phone book who are not on Shoto.

There are some implementations of the present invention that allow the user to invite other users to view unshared memories. When the user clicks on "Start Sharing Photos" 2702 or "Who was with you in this album" 2502 the user will see a screen with a list of friends and contacts with whom they can share the memory, shown on screen 2800 in FIG. 28. When the user clicks on the box with the name of the friend/contact, the empty circle beside the name 2802 fills in with a check mark 2804. When the user clicks "Next" 2806, they will see the photos that belong to the memory with a check mark 2302 in the bottom right hand corner of the photo indicating a selected state, displayed on screen 2300 in FIG. 23. When the user clicks "Send" 2304, the selected photos will be shared to those selected individuals. Those selected to view the photos will see the photos in screen 3100 as illustrated in FIG. 31.

Figure 15:
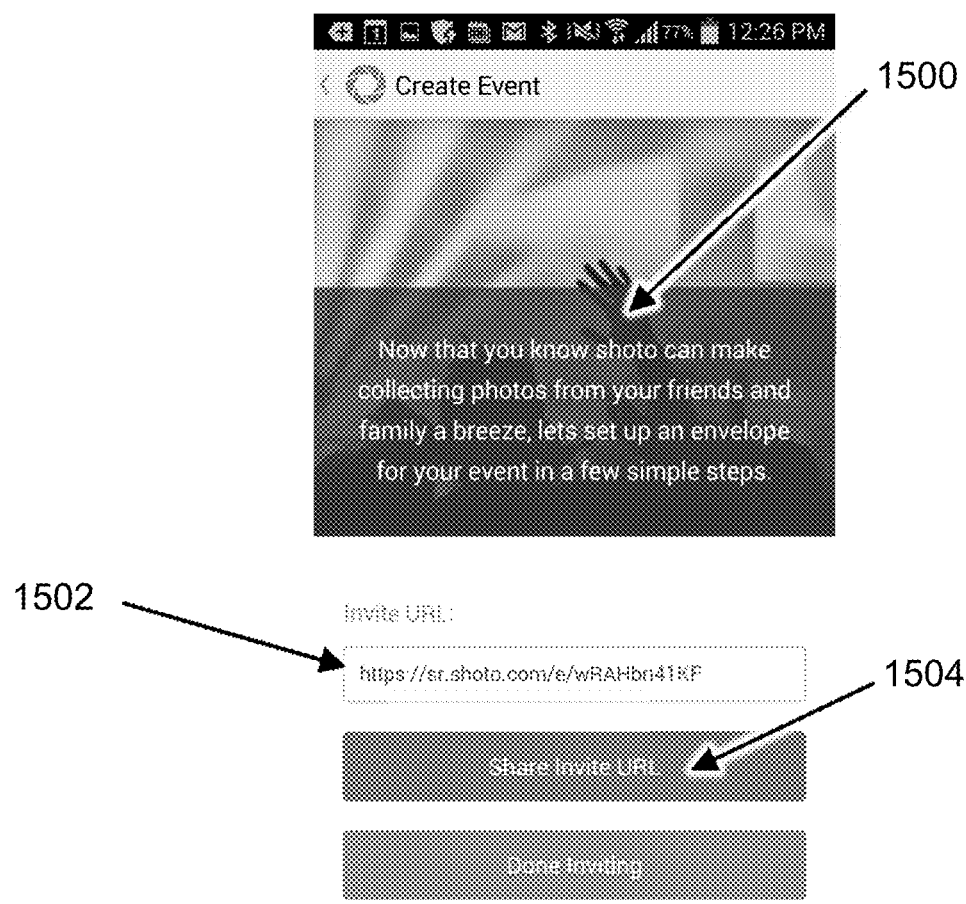
FIG. 15 depicts a non-limiting, exemplary mobile user interface; in this case, a user interface for sharing a created event. The user can share the event by sharing a URL that serves as a link to the event web page. When the user presses the button that says "Share Invite URL", they see a variety of external applications through which the user can share an invite URL.
Figure 16:
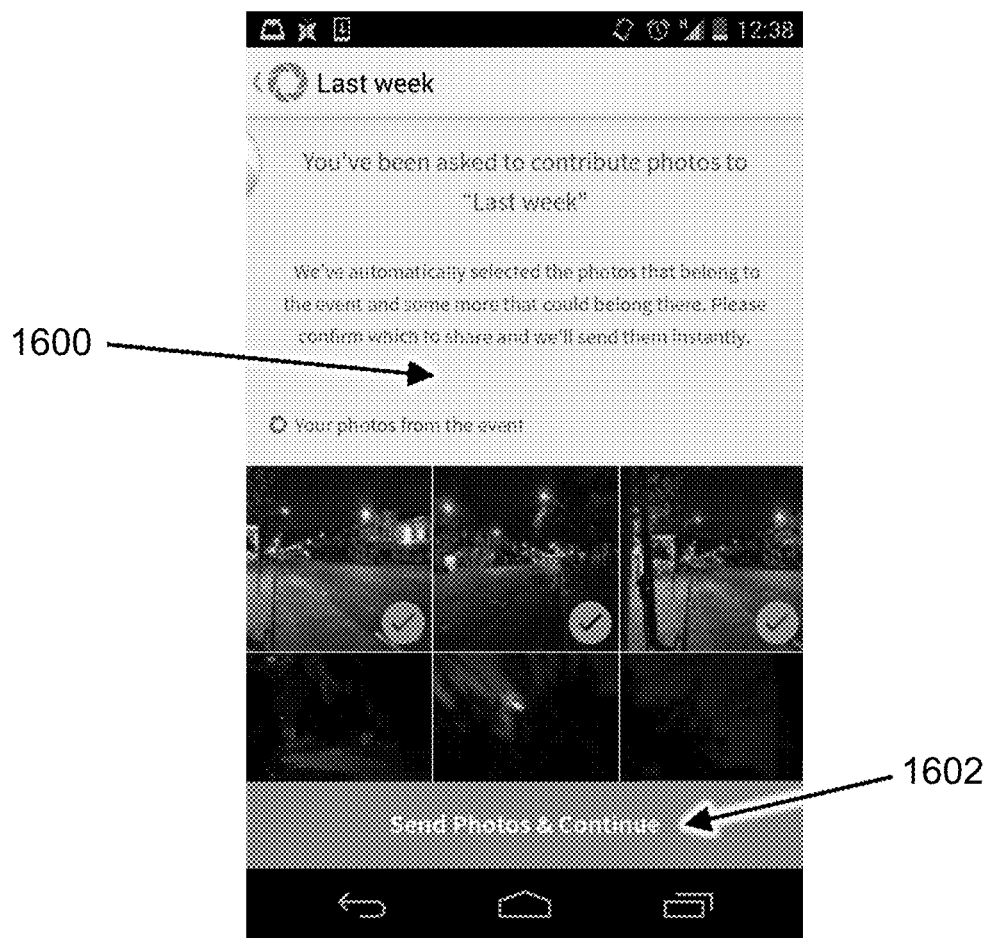
FIG. 16 depicts a non-limiting, exemplary mobile user interface; in this case, a user interface for adding photos to an event that the user attended. The user can toggle the selected state of the photo by tapping on it. When the user presses on the button labeled "Send Photos & Continue", the selected photos will be contributed to the event.
Figure 17:
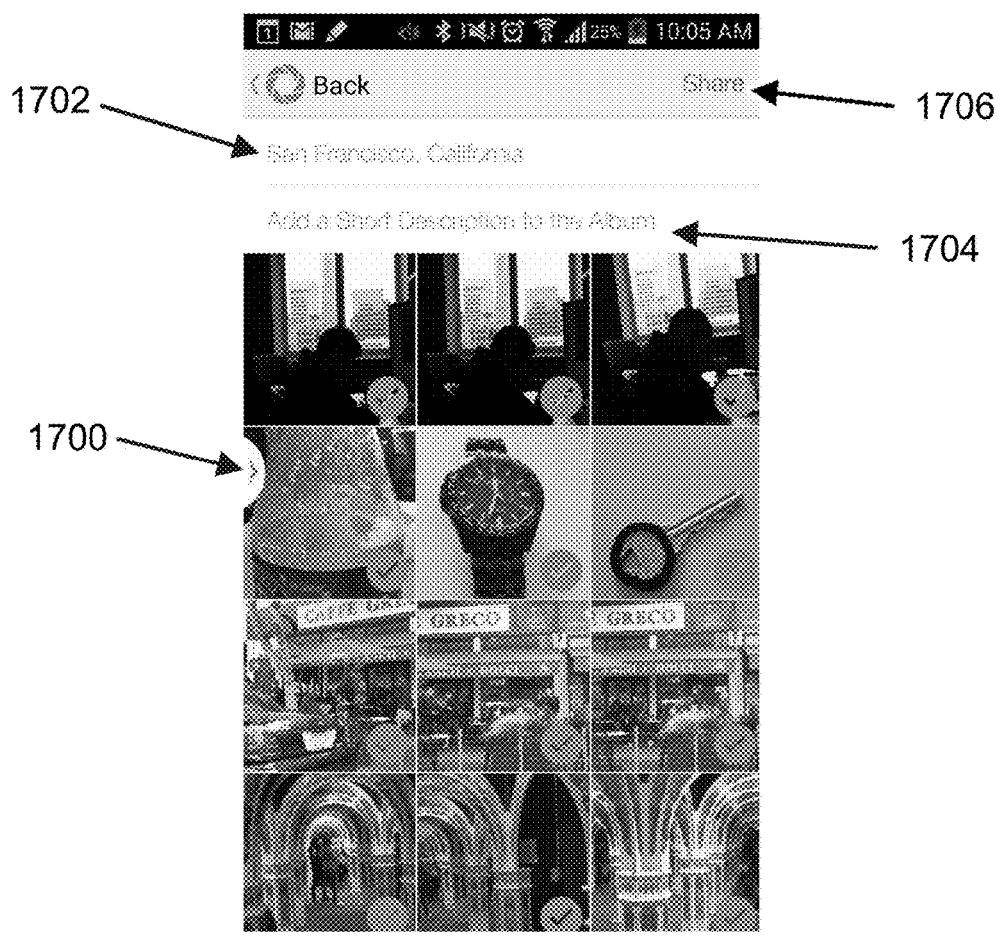
FIG. 17 depicts a non-limiting, exemplary mobile user interface; in this case, a user interface for uploading photos to Facebook. The user can upload an entire album by pressing the Facebook icon in the album view. When the user presses the Facebook icon, they will be taken to the Facebook upload screen, from which the user can edit the title and description of the album. The user can also select which photos they want to upload by tapping on them. When the user presses the button labeled "Share", the selected photos will be uploaded to Facebook.

There are certain implementations of the present invention that allow the user to share an event the user created. In FIG. 15, screen 1500 provides the user with a route to share their event. When the user clicks "Share Invite URL" 1504, the URL for the event 1502 can be shared through a variety of routes. When the user chooses a route, a link to the event will be preloaded into the message. When the user sends the Invite URL, the event will be shared with those selected users. When the invited user clicks on the invite URL and they have not yet downloaded Shoto, they will be linked to download Shoto and taken through onboarding. During onboarding, the invited user will see an intermediate onboarding screen 1600 as seen in FIG. 16. When the user clicks on "Send Photos & Continue" 1602, those photos that the user has selected from the event are uploaded to the event feed.

There are certain implementations of the present invention that can share an album built in Shoto to Facebook. The user can share a memory to Facebook from the album view. When the user clicks on the share to Facebook icon 3002, they are taken to a pre-upload screen 1700. The user can manually set a location 1702 and add a short description 1704. When the user clicks "Share" 1706, the album is uploaded to Facebook.

Proof by Action

Shoto uses "Proof by Action" to infer that users are sharing the same moment or event (e.g., they are attending the same wedding, baseball game, dinner party, etc.), and thus allow the users to see each other's photos of the moment or event, depending on the users' settings. Proof by Action can work retrospectively as described above in the UIKY/Photo Metadata comparison analysis. Proof by Action can also work in the moment by automatically checking users in when they use Shoto on any given occasion or in the background at any significant change of location. Again, in this scenario, where two users' UIKY match and they are checked in at a similar place and time (with certain built-in tolerances described in more detail below), they will be allowed to view each other's photos taken at that event or moment, depending on their settings. Proof by Action is important because it allows users to efficiently set privacy as part of their workflow, rather than requiring them to step out of it.

Certain embodiments provide information to users about the contributors in an album (for instance links to their profiles and further information). And, contributors to a shared album can be edited (removed and in the future added) from this view. Shoto can display the profile for other contributors to an album, including the option to remove their photos from a user's view of the album or to block this contributor from seeing the user's photos in their album.

In addition to Proof by Action privacy safeguards, Shoto uses a Salted Encrypted Device Key ("SEDY") to decipher the device of a user and keeps all mapping of UIKY to SEDY.

The above-described features allow users to relive moments much more easily than they can with existing solutions. This is possible; first, because a user will likely have access to more photos of any given event or moment than they would otherwise, as Shoto makes it easy to automatically shares photos with the desired recipients, allowing users to concentrate on actually enjoying the moment as it happens.

Aside from having more photos to look at, users also get the benefit of Shoto's ability to intelligently deliver photos back to the user using Shoto's "Memory Genie." This would use Photo Metadata alongside user relationships to suggest contextually relevant photos to the user. For instance, Shoto can automatically notify the user when the user takes a photo at Location A that the user was also at eight months ago (inferred from Photo Metadata), and can show the user the photos from that time. Or, for example, Shoto can remind the user what the user was doing "one year ago today" by displaying the user's photos that were taken a year ago (inferred from Photo Metadata).

Discovery

Certain embodiments display graphic representations of social connections to the user (hereinafter referred to as a "ShotoGraph"). A ShotoGraph may show, for instance, the number of times two users spend time together (based on Photo Metadata) with a certain graphic representation (e.g., a number, a line of varying width, color or other characteristics, etc.). It could also show the duration of each event, or the locations of each get-together between the users on a map. Users can use ShotoGraph to visually explore their social connections, e.g., "Who do I go to the park with? Who do I go to eateries with? Who do I go on holiday with?"

End levels of ShotoGraph may be queried using dynamic taxonomies. For instance, a user could first query whom the user goes to restaurants with. Then, the user could break down the query to only discover whom the user goes to Italian restaurants with. Additionally the user could query the ShotoGraph and ask it for a recommendation for a restaurant and the graph will return results that include but are not limited to places they have not been to but friends that eat that cuisine have, that eat with the user have, that are friends with the user.

Figure 5:
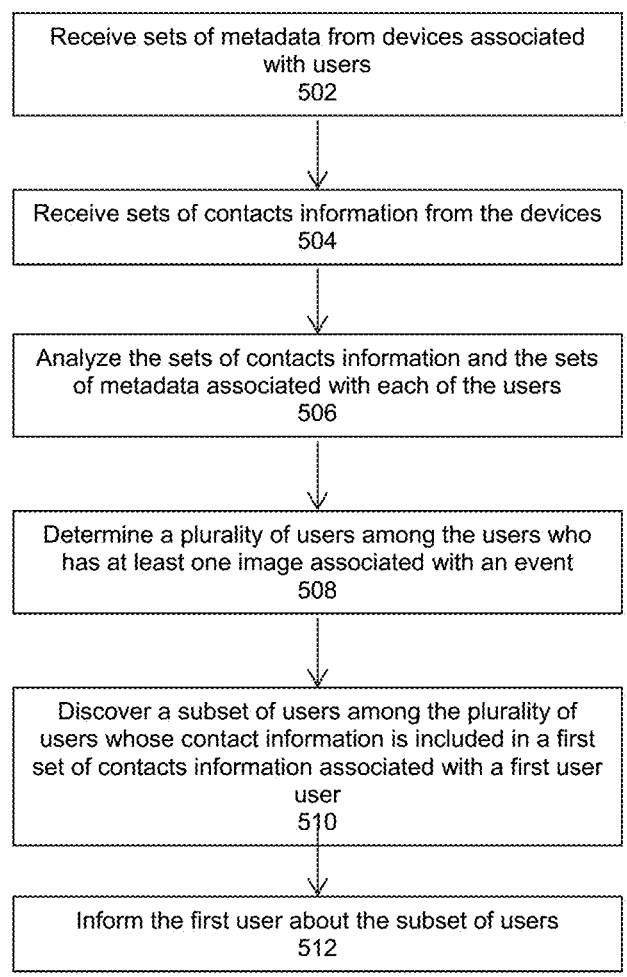
FIG. 5 illustrates a flowchart of exemplary steps for identifying a plurality of users having at least an image associated with an event, according to an exemplary embodiment of the present invention.
Figure 6:
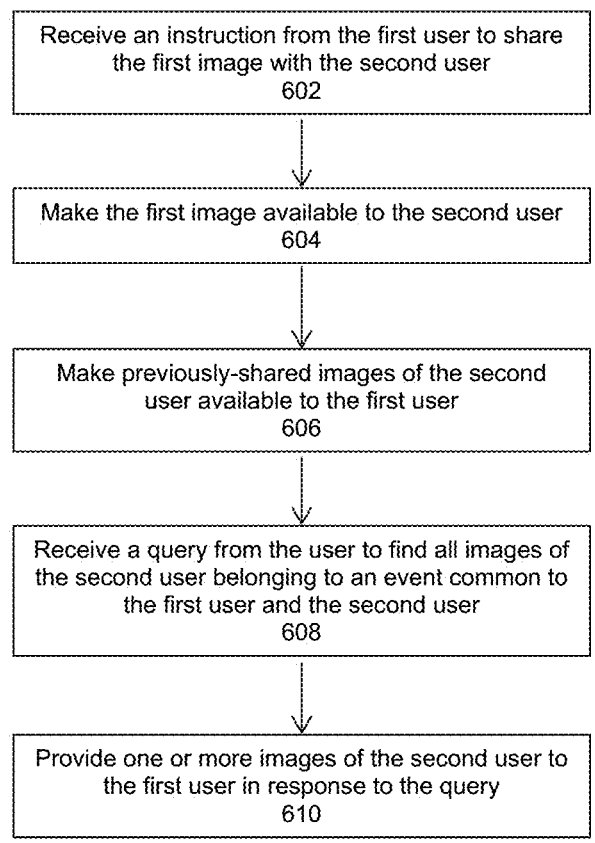
FIG. 6 illustrates a flowchart of exemplary steps for sharing an image of a first user with other users, according to an exemplary embodiment of the present invention.

Referring to FIG. 5, in a particular non-limiting embodiment, there exists a method through which the system can inform a first user of other Shoto users in their phone book who have photos from a common event. The server receives sets of metadata associated with a group of users 502. The server then receives sets of contact information from each of the devices 504. First the system looks to see if the photos that were taken by each of the devices belong to a common event 506. When the system finds a group of users who have at least one image associated with the event 508, it then looks a subset of those users who are in the phonebook of the first user 510. When the system finds the subset of users who are in the phonebook of the first user, it alerts the first user to the existence of the subset 512.

Figure 21:
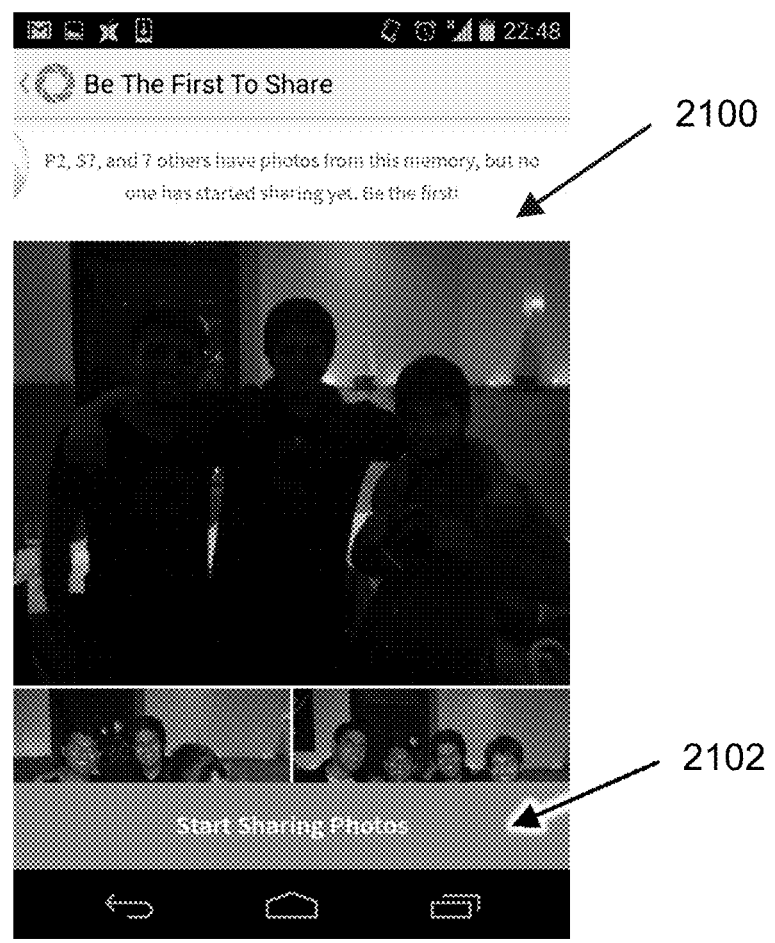
FIG. 21 depicts a non-limiting, exemplary mobile user interface; in this case, a user interface for presenting a screen the user will only see if they have taken photos in the proximity of friends who are also on Shoto, and no one has started sharing their photos from the event. When the user presses the button that says "Start Sharing Photos" they will be taken to a screen from which they can select people with whom to share the photos.
Figure 24:
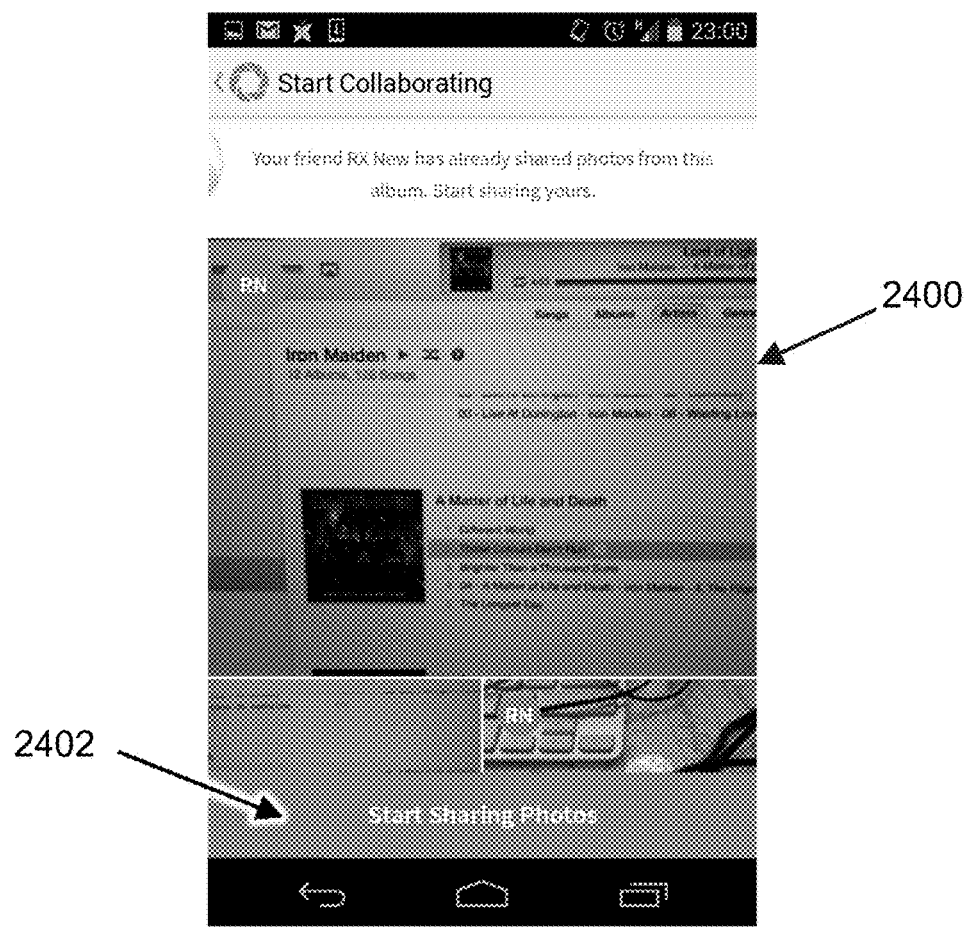
FIG. 24 depicts a non-limiting, exemplary mobile user interface; in this case, a user interface for presenting a screen the user will only see if they have taken photos in the proximity of friends who are also on Shoto, and other people who were at the event have already started sharing their photos. When the user presses the button that says "Start Sharing Photos" they will be taken to a screen from which they can select people with whom to share the photos.
Figure 25:
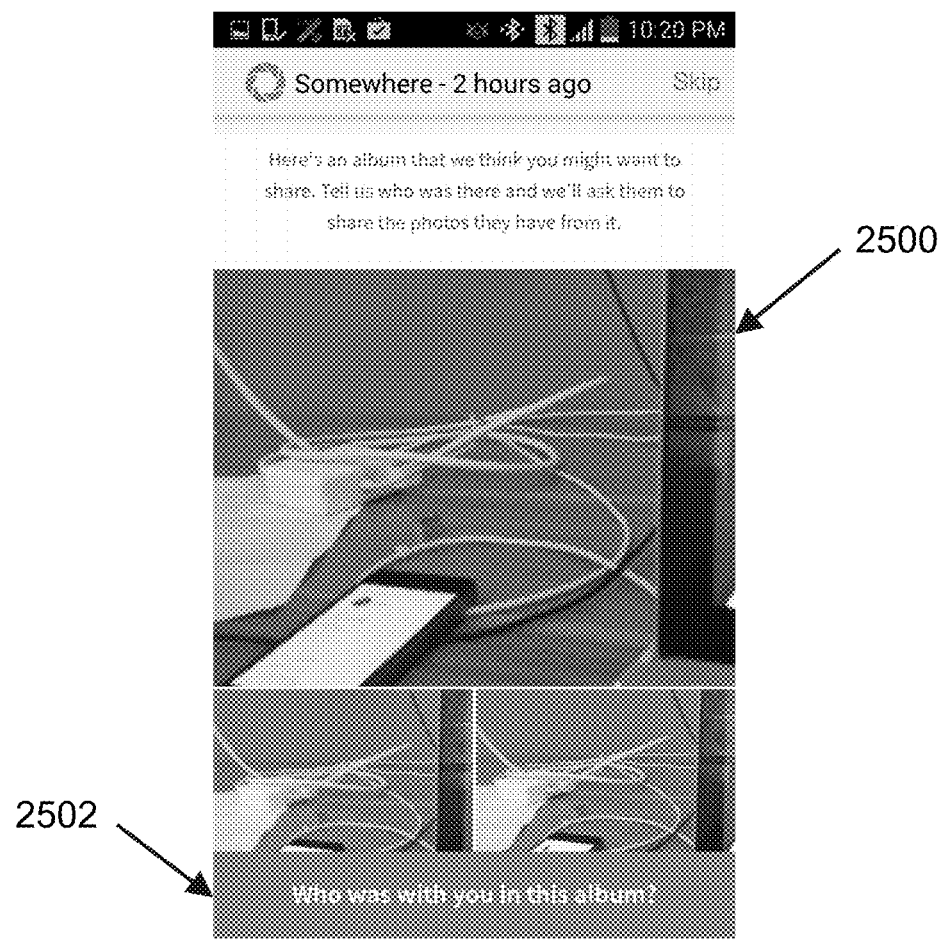
FIG. 25 depicts a non-limiting, exemplary mobile user interface; in this case, a user interface for presenting a screen the user will only see if they have not taken photos in the proximity of friends who are also on Shoto. This screen shows the user the album on their phone that has the most photos and is therefore labeled their most significant album.

Certain implementations of the present invention suggest memories that the user might find significant and prompt the user to share the aforementioned memories. The case in which more than one individual possesses photos that belong to a common memory is hereinafter referred to as an "undiscovered" moment. The present invention has the ability to prioritize suggested memories by: the undiscovered state of the memory; the shared state of the memory; and the number of photos that were taken in creating the memories. Screen 2100 in FIG. 21 is an example of a memory that was suggested because of its undiscovered state and has not yet been shared. Screen 2400 in FIG. 24 is an example of a memory that was suggested because of its undiscovered state, and has already begun being shared. Screen 2500 in FIG. 25 is an example of a memory that was suggested because the user does not have memories with friends on Shoto, and so is shown the memory on their camera roll with the most photos.

As albums are built or updated by Shoto, they can appear at the top of a dynamic album view that will show the user things that have occurred more recently than others. Further, embodiments may employ dynamic organization and reorganization within the album itself. As an example, this capability allows Shoto to display different photographs in the beginning of the album to users each time they open it. Camera reels in Shoto can be "collective"; they display not only the User A's photos of an event/moment, but also other users' photos of the event/moment, if these other users permit User A to see them.

Image Search

Certain embodiments have search capabilities that allow users to easily look for photographs (hereinafter referred to as "Image Search"). Image Search applies algorithms to Photo Metadata to retrieve photographs desired by the user. For instance, Image Search can be used to retrieve all photos of a user with another user in a specific restaurant, or of the two of them in any restaurant. A user may use Image Search to create photo albums on the fly, e.g., to easily create an album composed of the photos turned up in the results of an Image Search.

Social Recommendation Engine

Some embodiments include a tool for social recommendations (hereinafter referred to as a "Social Recommendation Engine"). The Social Recommendation Engine analyzes Photo Metadata and UIKYs to gain insights that may be useful in delivering social recommendations and other services to users. To illustrate the utility of the Social Recommendation Engine and demonstrate how it may work in certain embodiments, consider the following examples.

The Social Recommendation Engine may gather that User A attends baseball games multiple times per season with User B, from their Photo Metadata and Encryption Keys. The Social Recommendation Engine can then notify User A and User B that there is a baseball game in one week, attach a picture of the two of them at a baseball game, and include a link to buy tickets.

The Social Recommendation Engine may gather that User C eats at Chinese restaurants more than any other type of restaurant. The Social Recommendation Engine can then deliver recommendations for highly-rated Chinese restaurants to User C.

Notifications

Certain embodiments notify users of certain events. In some embodiments a notification is for discovery. In other embodiments, a notification is for a reminder of an event (e.g., a shared memory). For instance, a notifications screen shows updates to albums (e.g., a new user joined, a user added photos, etc.), new local photos to be added to Shoto and any news from Shoto. This will also provide other notifications related to features (e.g. nudges from other users, photos viewed, photos printed, etc.).

There are some implementations that notify the user that one of their contacts has joined Shoto and see the number of overlapping moments the user shares with the newly joined contact. When the user clicks on notification 3502 in FIG. 35, the user will be taken to the unshared tab 3602 as seen on screen 3600 illustrated in FIG. 36.

Figure 35:
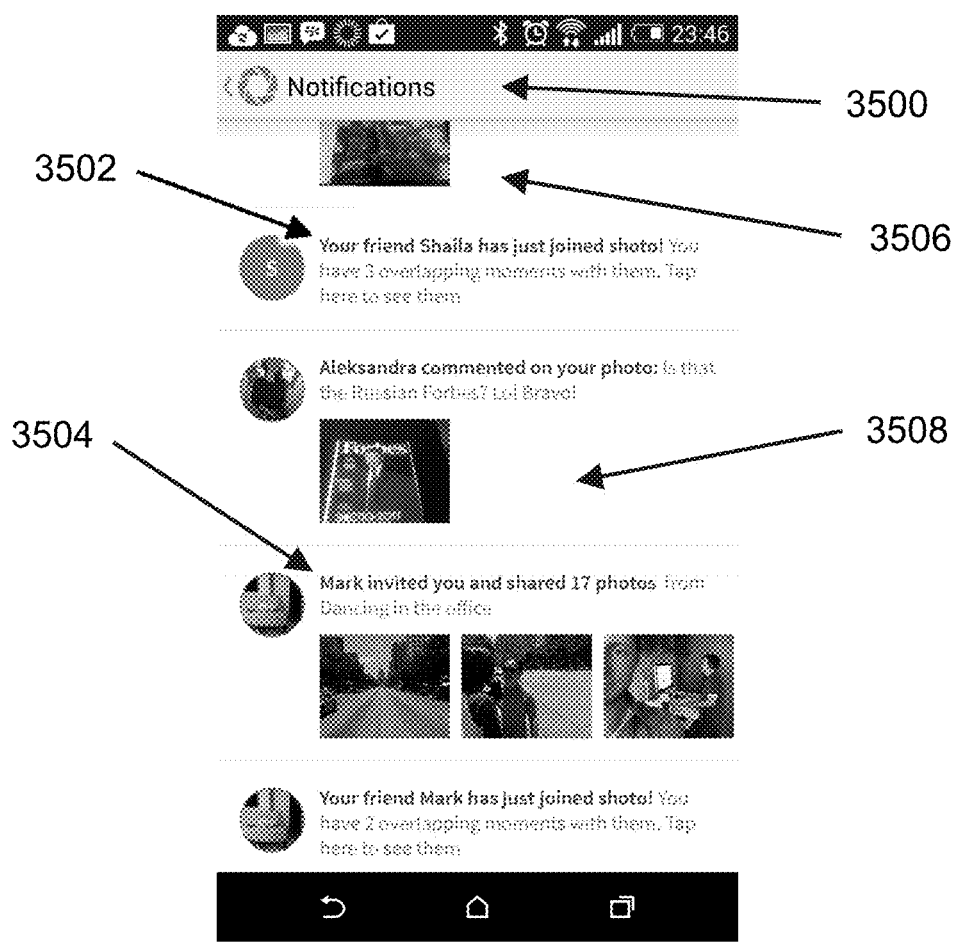
FIG. 35 depicts a non-limiting, exemplary mobile user interface; in this case a user interface for notifying the user to various activities that take place within the app.
Figure 36:
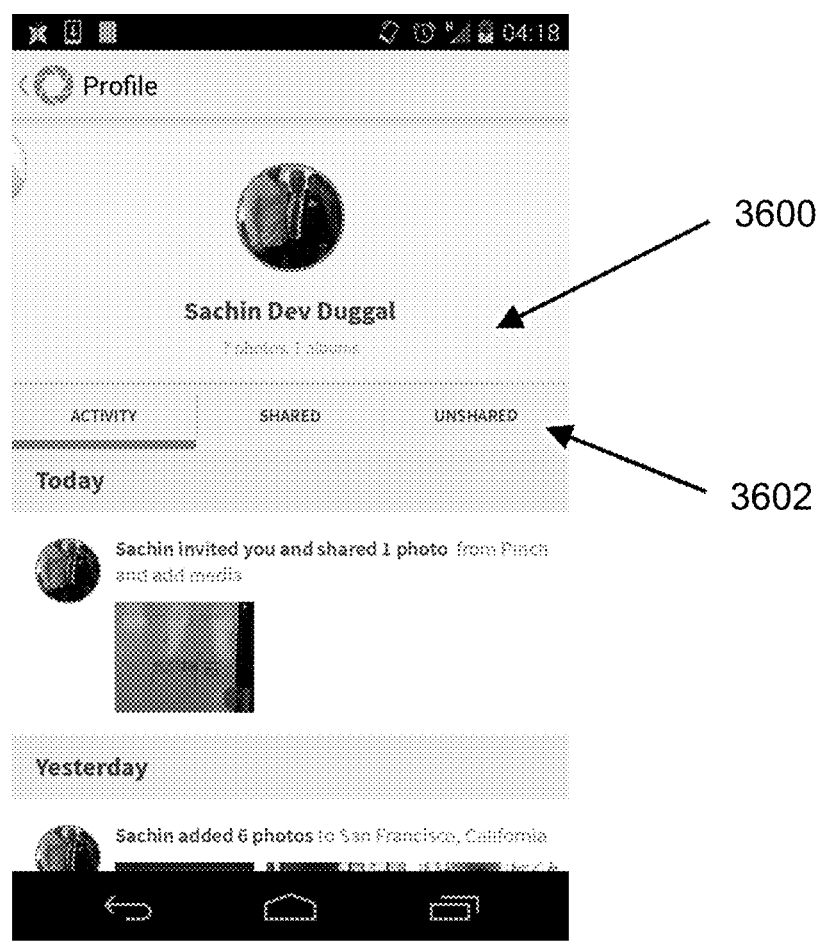
FIG. 36 depicts a non-limiting, exemplary mobile user interface; in this case a user interface for presenting a screen the user will see when they press on the activity tab in another user's profile. The screen will show the various actions that user has performed within the app including commenting and sharing.

There are some implementations that notify the user that they have been invited to view photos from an event 3504 in FIG. 35. When the user clicks on notification 3504 they should see the photos from the album in screen 3100 as illustrated in FIG. 31.

There are some implementations that notify the user that photo from an undiscovered moment that they were apart of have begun being shared. When the user clicks on notification 3506 in FIG. 35, they should see the photos from that album in screen 2400 as illustrated in FIG. 24.

Figure 44:
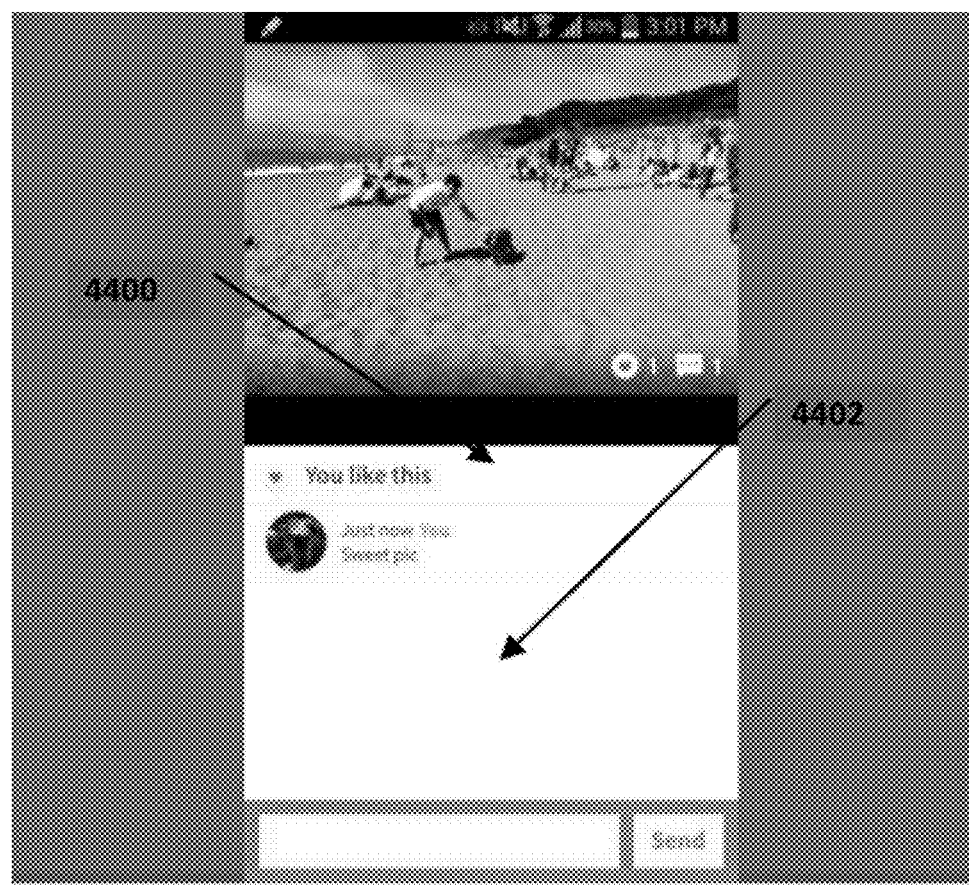
FIG. 44 depicts a non-limiting, exemplary mobile user interface; in this case a user interface for viewing and adding comments to a shared album.

There are some implementations of the present invention that notify the user that one of their photos has been commented on by another user. When the user clicks on notification 3508 in FIG. 35, they will be taken to the image that was commented 3100 on and see comment dialogue 4402 as seen on screen 4400 illustrated in FIG. 44.

There are certain implementations of the present invention that show the user actions taken by another user within the app. The activities presented under the activity tab on screen 3600 are the same activities that appear in the user's notification page, however any activities that don't pertain to the user whose profile is being viewed, are filtered out.

Storage of Data

All location data is stored in a database, images are stored either on a platform of the users choice or on Amazon Simple Storage Service (S3). Shoto integrates with Google Drive and other storage vendors. High speed records are stored in Redis and other in memory systems like Memcache for speedy access.

Additional Non-limiting Features

Certain embodiments include a messaging utility (hereinafter referred to as "Shoto Messenger"). Some embodiments allow users to engage in a peer-to-peer stock photography service. Shoto matches user requests for photos with certain parameters (e.g., a close-up shot of a ladybug or a set of street scenes in Paris) with users who are in proximity to the desired photo (or, if the request is non-specific as to location, by some other measure). Users then have the option to purchase or otherwise acquire rights to the photographs that other users have taken (either directly in response to a user request, or otherwise), from within the Shoto app itself. In some embodiments, this process takes the form of a reverse auction, in which a user makes a bid in exchange for the work being done (i.e. for the desired photo(s) being taken).

Some embodiments allow users to share viewfinders when using the in-app camera and when certain permissions are met. In other words, User A could view in real time (or near-real time) what User B is seeing on User B's viewfinder. User A might find this useful either to direct User B as to what photographs User B should take, or possibly just for User A to feel a closer connection with the moment that User B is capturing.

Certain embodiments allow users to easily have their photos printed and shipped to them or to another person or location. Users have the ability to pay for this service from within the Shoto app. For example, User A may desire to give a printed photo album of all of User A's photos of user A and User A's mother to User A's mother for her birthday. User A can use Image Search to find all of these photos, then compile an album of the photos, and as a final step pay for the album to be printed, bound, and shipped to User A's mother.

When such a purchase is made then all users can be notified about the purchase and can then also purchase it (i.e., creating intent on the back of contextual relevance), or the user purchasing can buy for all people who were there.

Small businesses can query the social graph to find out anonymously the kind of people coming to their business on a paid query. They can also invite certain types of users (early adopters, users that like a competitor) to their place of business or send a special offer on a chargeable basis.

Some embodiments use Application Programming Interfaces (APIs) to further extend the power and utility of the Shoto application. APIs allow Shoto to integrate with other applications and systems. For instance, a Facebook API connected to Shoto might allow Shoto to gather all of User A's photos from user A's Facebook account, which might be convenient for User A.

Some embodiments utilize user gestures as part of the workflow in order to streamline processes and make them intuitive. For instance, in some embodiments a double tap on the screen can make all informative overlays disappear, exposing a clean and uninhibited view of a photograph or viewfinder window. Or, a user can slash across a photo to either delete it (if it is that user's photo) or to hide it (if it is another user's photo). Or, another gesture (which could include a shake of the mobile device) could notify users with UIKY and Photo Metadata matches that they are possibly at the same event or sharing the same moment, and could then be prompted to share their photos with each other.

Certain embodiments may be used with wearable cameras and other augmented reality devices, such as Google Glass. Refer to Figure Set B for more details.

Some embodiments may allow users to easily view compiled "newspapers" of photos based on certain criteria. For instance, User A may desire to see all photographs taken in San Francisco on Jan. 1, 2010 that User A has access to (i.e., they are publicly shared or User A otherwise has permission to them). Shoto can compile an album of these photographs, along with other content that may include news stories related to the photographs (inferred from the Photo Metadata) or other information.

Certain embodiments allow users to comment on photos and rate them. These comments and ratings may either be publicly viewed or restricted to only certain users.

Some embodiments may take the form of a web application (as opposed to a mobile application intended to be opened only on a mobile device). This will enable users to upload photos taken with cameras or other devices that do not support the mobile app. Further features may include photo editing and organization. In certain embodiments of the web application, users can share photos and albums using shortened URLs that will lead the recipients to only those photos and albums that are intended for them to see (in addition to other methods of sharing).

Figure 43:
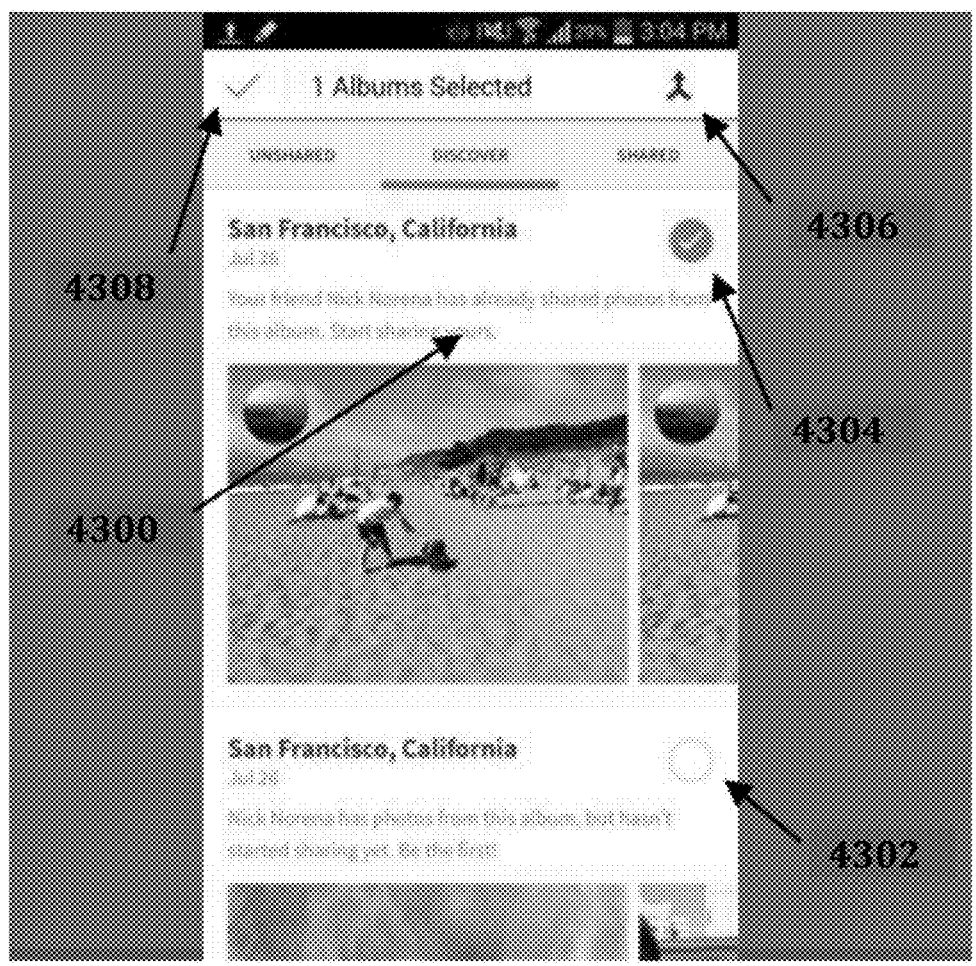
FIG. 43 depicts a non-limiting, exemplary mobile user interface; in this case a user interface for viewing shared albums by other users and sharing albums with other users based on a location and a date.

Some implementations of the present invention allow separate memories to be merged into a single album. In FIG. 13, screen 1300 exposes a slide out menu 1302. When the user clicks on "Merge Albums" 1306, the user will be able to select albums on screen 4300, as illustrated in FIG. 43. When the user clicks on empty circles 4302, the circle will fill with a check mark 4304, and the album will be considered selected. When the user clicks on the merge icon 4306, the selected albums merge into whichever album was selected first. The user can merge memories that are grouped under each of the three tabs on the timeline. If the user presses on check mark icon 4308, the merge will be cancelled.

Figure 40:
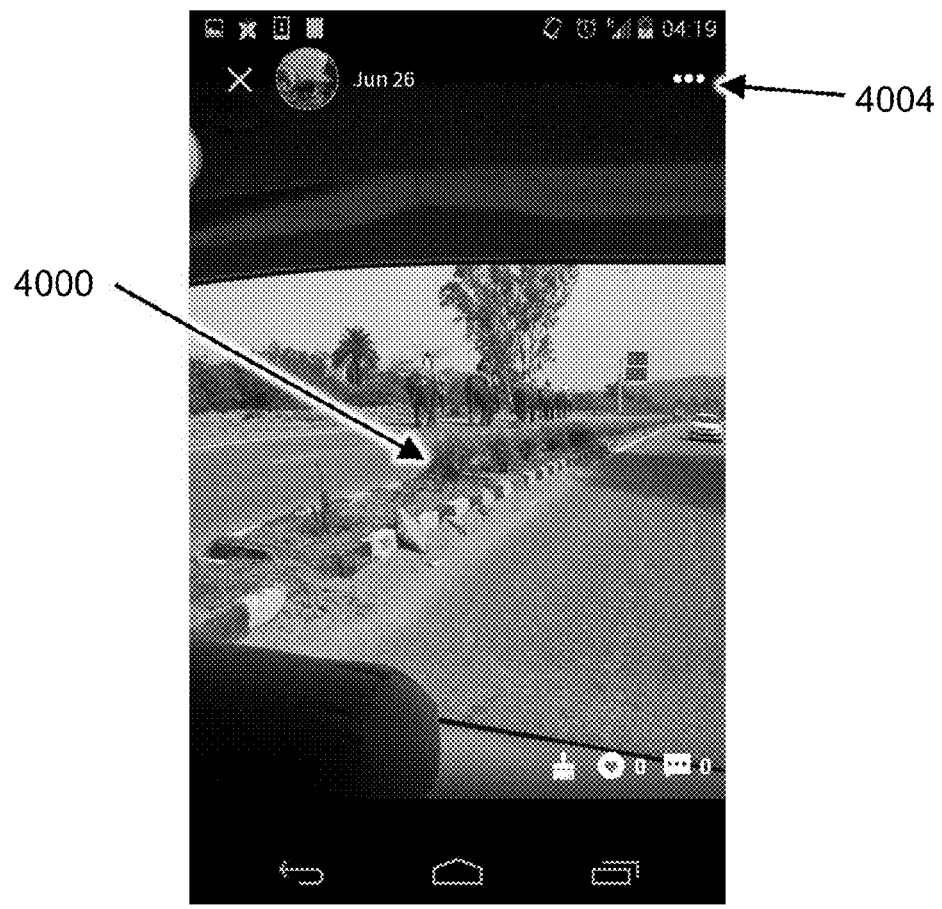
FIG. 40 depicts a non-limiting, exemplary mobile user interface; in this case a user interface for viewing a particular image within an album. The screen will show the image in full screen view and also the options to like, comment, and edit the photos. The screen will also show a button with three dots that can be used to access image settings.
Figure 41:
FIG. 41 depicts a non-limiting, exemplary mobile user interface; in this case a user interface for adjusting the image settings. The screen will show a toggle function to control the shared state of the photo. The screen will also show buttons labeled "Remove Photo" and "Report Photo". When the user presses on the button labeled "Remove Photo", the photo will be removed from the album. When the user presses on the button labeled "Report Photo", the photo will be reported to Shoto.
Figure 41:

There are certain implementations of the present invention that allow the user to unshare particular photos in a shared album. When the user clicks on image settings icon 4004 seen in FIG. 40, the user will see screen 4100 as illustrated in FIG. 41. When the user toggles share to "off" 4102, the image will be unshared from the album. Invited viewers and contributors to the album will no longer see that photo, and the photo will appear under the unshared tab on the timeline if it was not part of an undiscovered album. If the photo was part of an undiscovered memory, it will appear under the discover tab on the timeline.

There are certain implementations of the present invention that allow the user to remove memories from their timeline. When the user removes a memory from their timeline, their photos from that memory are also hidden from other users. When the user clicks on the trashcan icon 3004, as illustrated on album view 3000 in FIG. 30, the memory becomes hidden.

Figure 18:
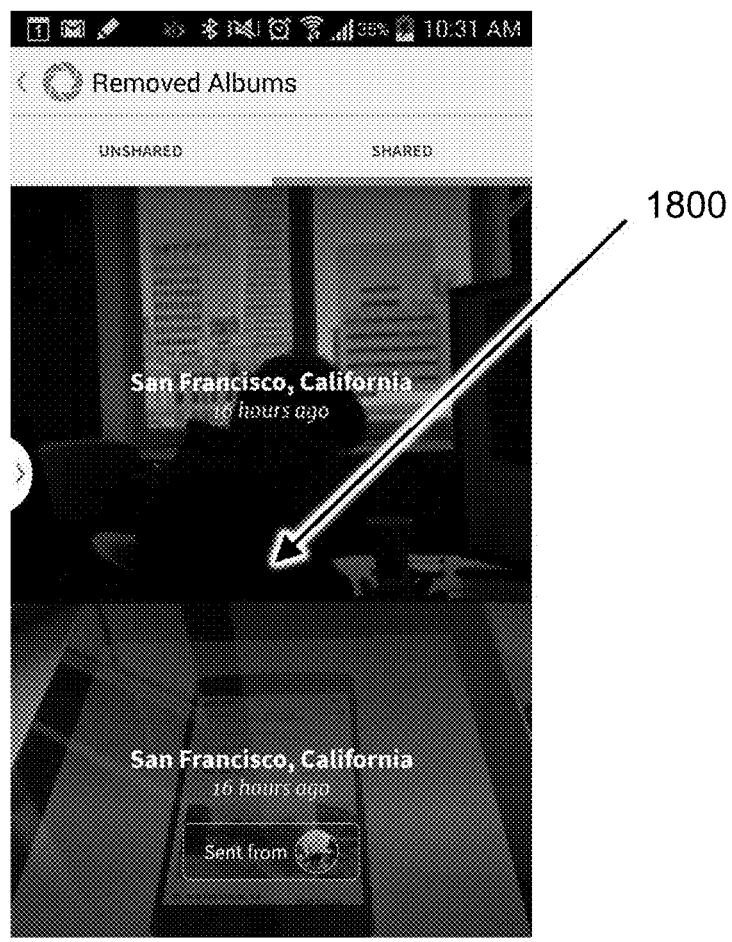
FIG. 18 depicts a non-limiting, exemplary mobile user interface; in this case a user interface for viewing albums that have been removed from the shared tab on the timeline. When the user presses on the preview for an album they will be able to view the photos in the album (and other information, too).
Figure 19:
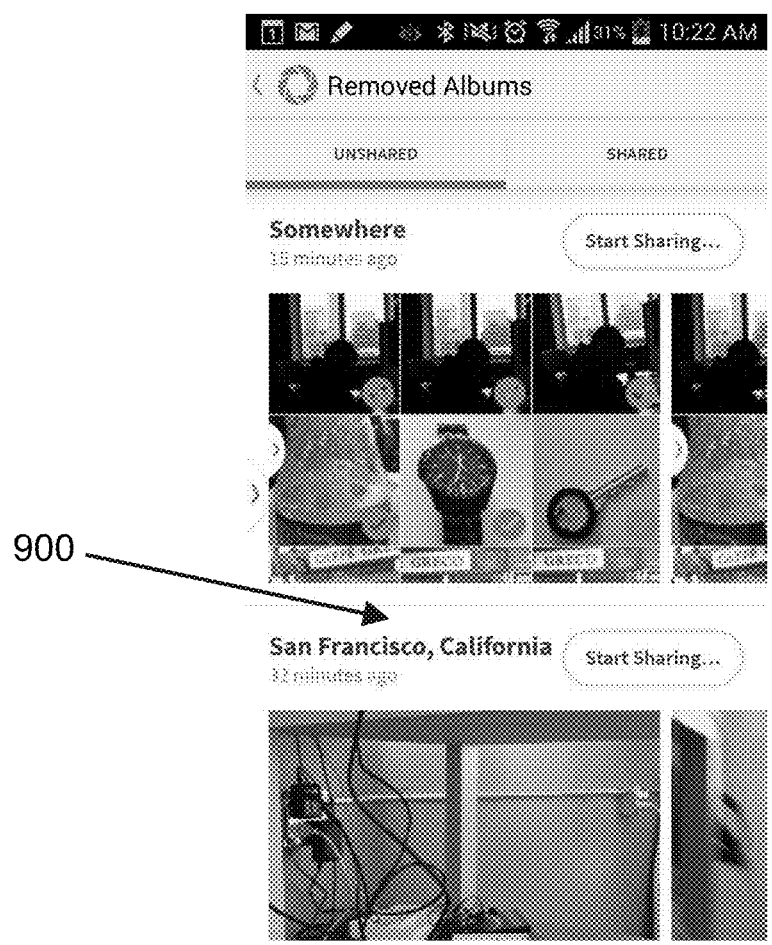
FIG. 19 depicts a non-limiting, exemplary mobile user interface; in this case a user interface for viewing albums that have been removed from the unshared tab on the timeline. When the user presses on the preview for an album, they will be able to view the photos in the album.
Figure 20:
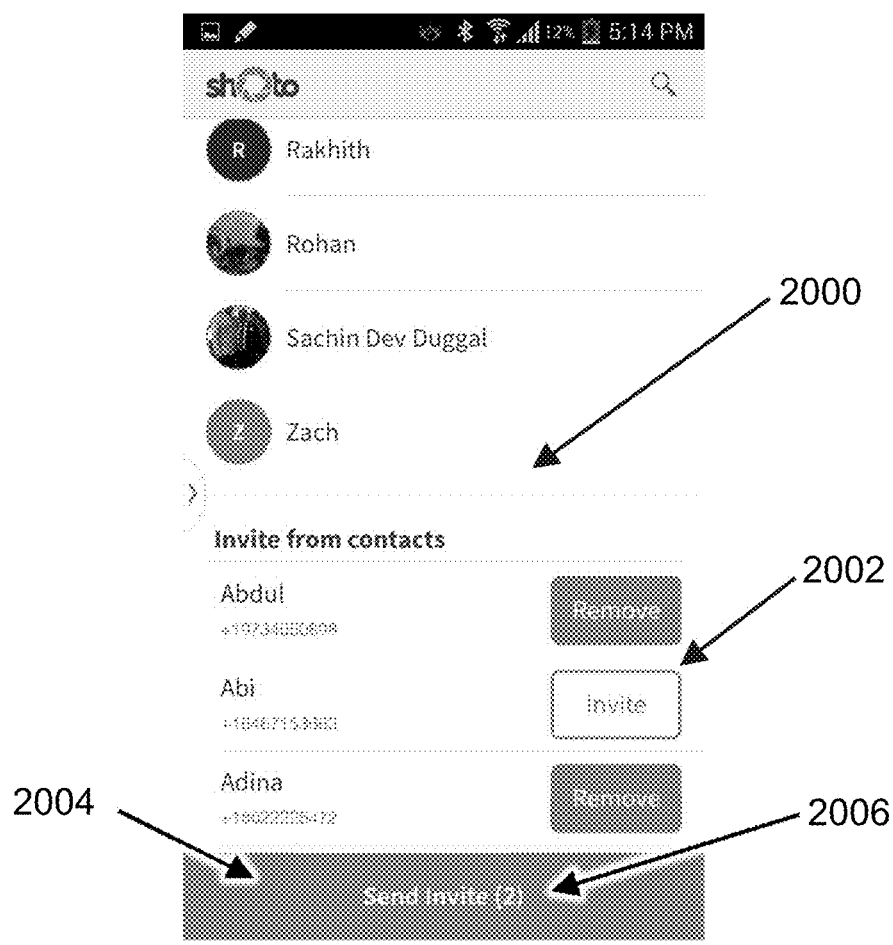
FIG. 20 depicts a non-limiting, exemplary mobile user interface; in this case, a user interface for presenting the screen the user will see when they press "Sounds Good!" on an onboarding screen. The screen shows the user and all the people in their address book who are on Shoto already. The screen also shows the user and list of all the people in their address book who are not Shoto and provide them with an opportunity to invite them to Shoto. When the user presses the button that says "Invite" beside the user's name, the button will change to say "Remove" and that user will be added as a recipient of a group SMS that contains a link to download Shoto. When the user presses the button that says "Send Invite," a SMS with a link to download Shoto will be sent to the selected contacts, and the button will change to say "Complete Onboarding." When the user presses the button that says "Complete Onboarding," they will be taken to a screen with suggests them an album to share.
Figure 39:
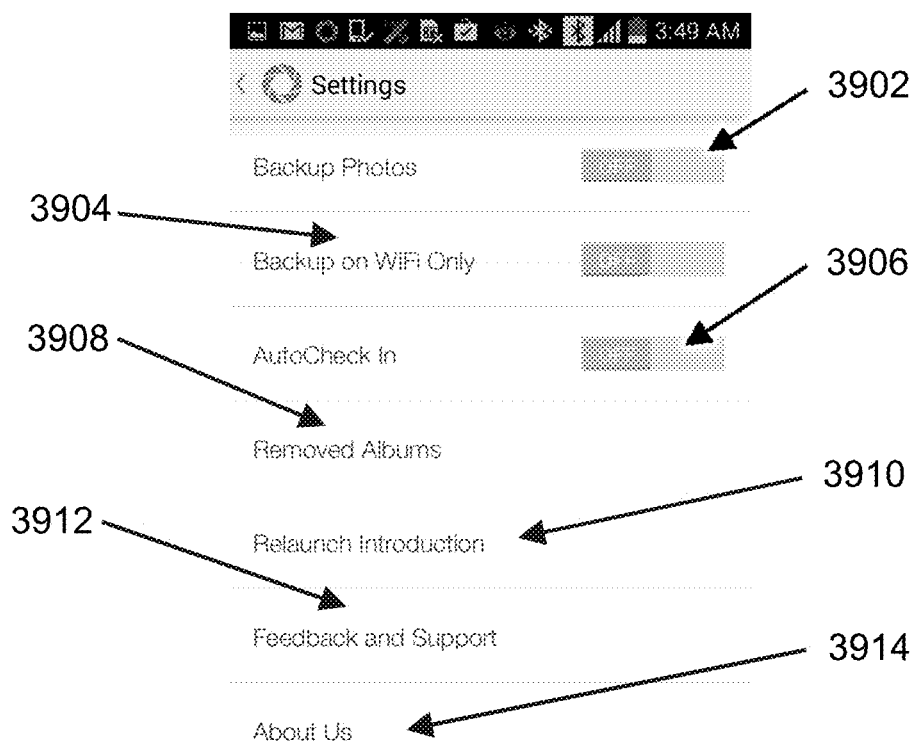
FIG. 39 depicts a non-limiting, exemplary mobile user interface; in this case a user interface for adjusting and accessing various settings. The screen will show a toggle function to back up the user's photos, back up the user's photos only when connected to Wi-Fi, and automatically check the user in with other Shoto users when they are with each other. Additionally, the screen will shows buttons to access removed albums from the timeline, a feedback system, and the company website.

There are certain implementations of the present invention that allow the user to view their Removed Albums. When the user clicks on "Settings" 1308 in slide menu 1302, the user will see app settings as illustrated in FIG. 39. When the user clicks on "Removed Albums" 3908, the user will see their removed albums. If the user removes a memory that has already been shared, the memory will appear under the shared removed memories tab, as seen on screen 1800 in FIG. 18. If the user removes a memory that has not yet been shared, the memory will appear under the unshared removed albums tab, as seen on screen 1900 in FIG. 19.

There are certain implementations of the present invention that allow the user add Removed albums back to their timeline. When the user adds a removed album back to their timeline, their photos from that memory reappear to other users who share or are invited to view that memory. When the user clicks on the plus sign icon 3102 on screen 3100, the memory is added back to their timeline, and the photos reappear.

Organization of Photos

Figure 26:
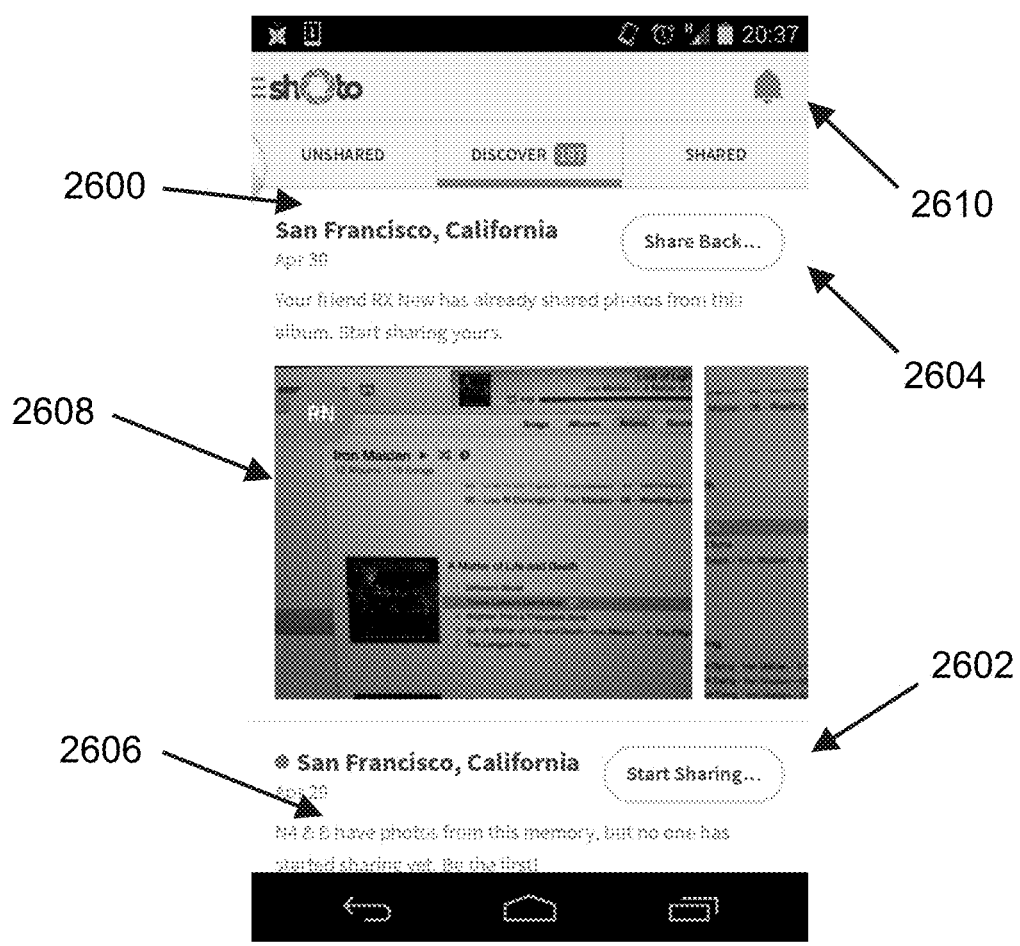
FIG. 26 depicts a non-limiting, exemplary mobile user interface; in this case, a user interface for presenting a screen the user will only see if they have taken photos in the proximity of friends who are also on Shoto. The screen shows the user their photos from a particular time when they were with other Shoto users. By pressing the button labeled "Start Sharing", the user can share photos with other users who were there when the photos were taken, in addition to contacts and users who were not there.
Figure 33:
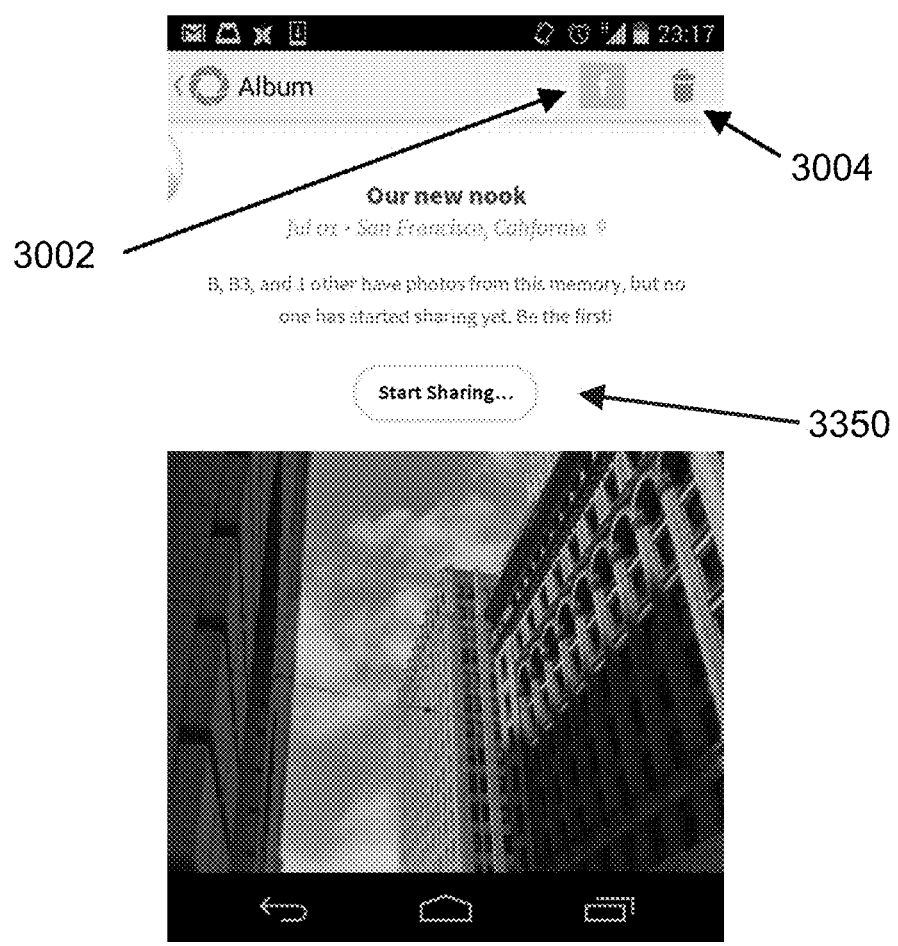
FIG. 33 depicts a non-limiting, exemplary mobile user interface; in this case a user interface for presenting a screen the user will see when they press on the preview of an album that is comprised of unshared photos the user took when they were in the vicinity of other Shoto users. The screen shows the user's photos from the collection, in addition to a button labeled "Start Sharing". When the user presses the button labeled "Start Sharing", they can share the photos they took with other users who were in the vicinity of the user when the photos were taken. The user can also share the photos with other Shoto users and contacts from their phonebook, not on Shoto.
Figure 34:
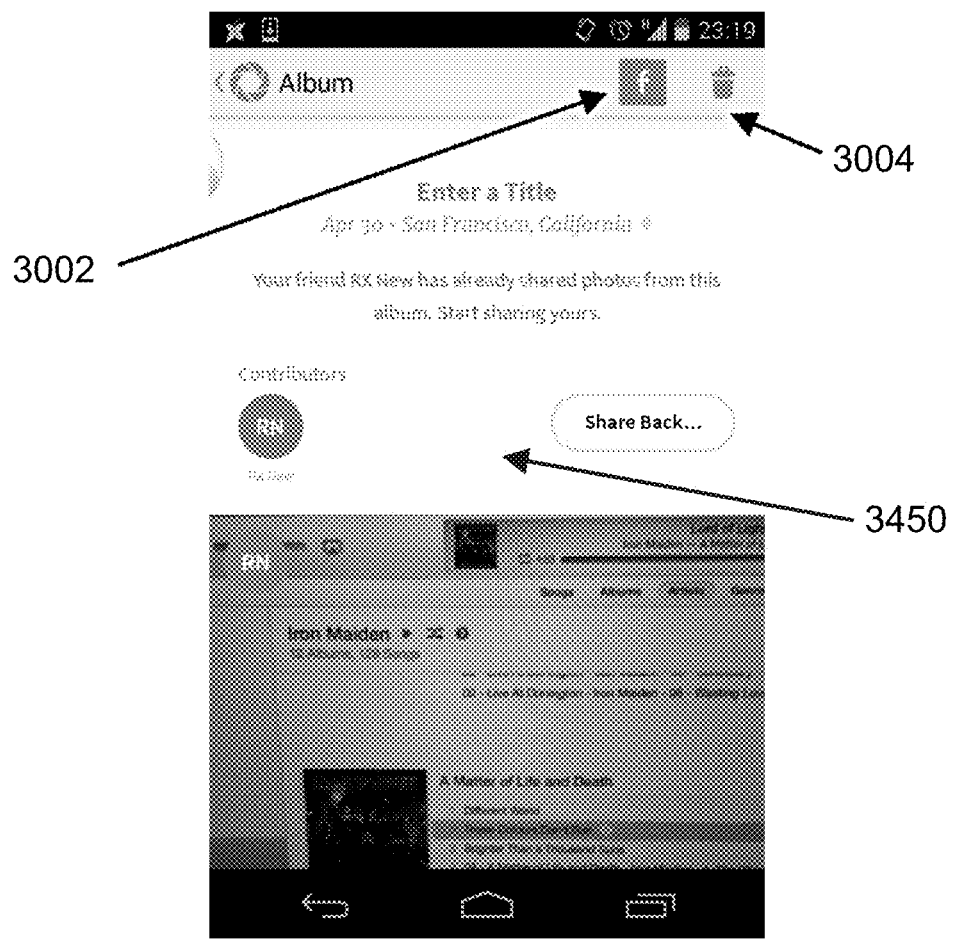
FIG. 34 depicts a non-limiting, exemplary mobile user interface; in this case a user interface for presenting a screen the user will see when they press on the preview of an album that is comprised of unshared photos the user took when they were in the vicinity of other Shoto users, and those other users have already started sharing their photos from the event. The screen shows the photos that belong to that album, and who has already started contributing to that album. The screen will also show a button labeled "Share Back". When the user presses on the button labeled "Share Back", they will be able to share their photos with other Shoto users and contacts from their phonebook, not on Shoto.

Some implementations of the present invention allow undiscovered moments to be grouped under a single tab in a timeline. Screen 2600 in FIG. 26 displays the user's undiscovered moments in a timeline view. 2606 illustrates an undiscovered moment that has not begun to be shared. 2608 illustrates an undiscovered moment that has already begun to be shared by other members of the memory. When the user clicks on "Start Sharing . . . " 2602 or "Share Back" 2604, they are taken through the sharing process illustrated in FIGS. 22-23. When the user clicks on the previews of photos in the album 2606, the user will see the photos in screen 3350 as illustrated in FIG. 33. When the user clicks on previews of photos in the album 2608, the user will see the photos in screen 3450 as illustrated in FIG. 34.

Figure 27:
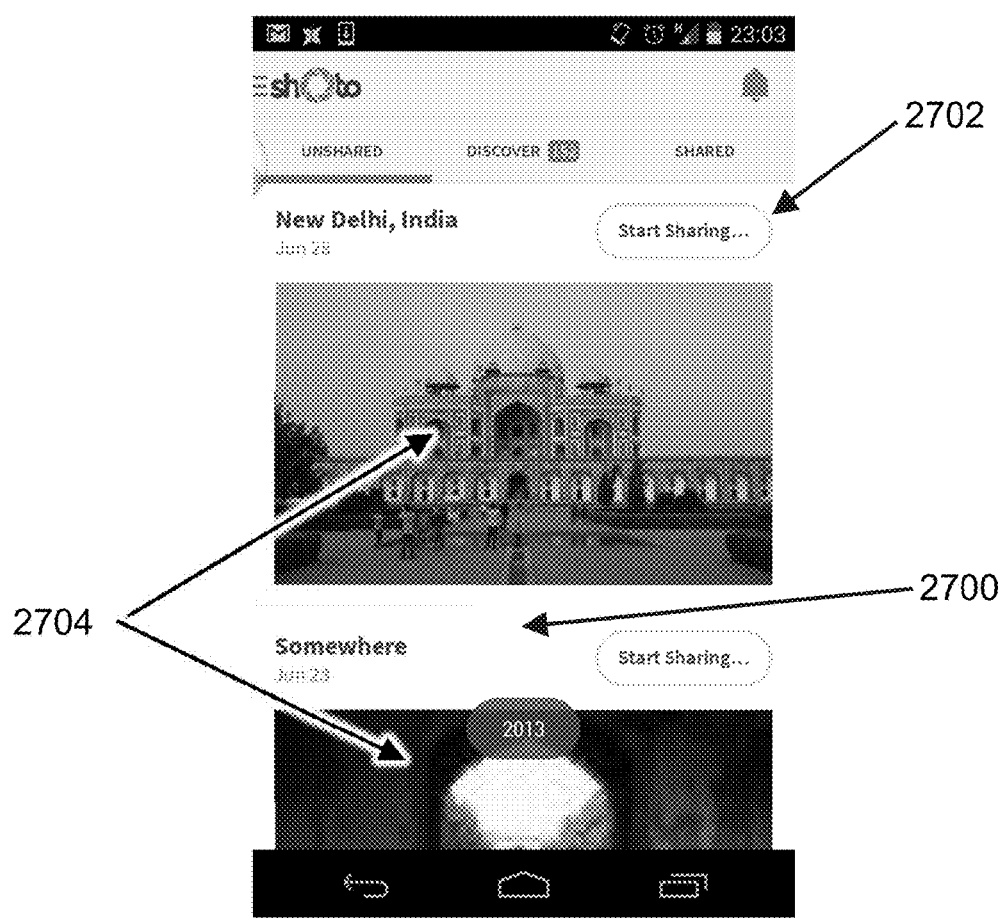
FIG. 27 depicts a non-limiting, exemplary mobile user interface; in this case a user interface for presenting a screen the user will only see if they have taken photos while they were removed from other Shoto users. When the user presses the button labeled "Start Sharing", they will be able to share those photos with friends on Shoto and contacts from their phone book.
Figure 32:
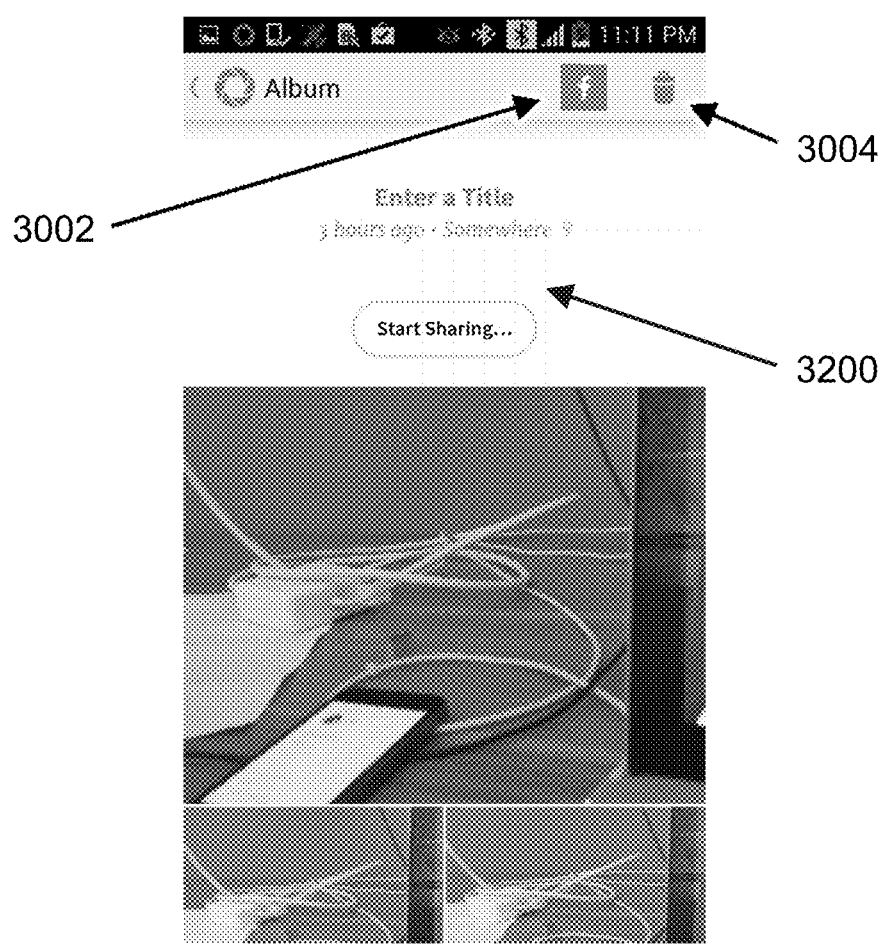
FIG. 32 depicts a non-limiting, exemplary mobile user interface; in this case a user interface for presenting a screen the user will see when they press on the preview of an album that is comprised of unshared photos the user took when they were removed from other Shoto users. The screen shows the photos in the album, in addition to a button labeled "Start Sharing". When the user presses the button labeled "Start Sharing", they can share the photos in the album with other Shoto users and contacts from their phone book, not on Shoto.

Some implementations of the present invention allow memories which the user experienced independently to be grouped under a single tab in a timeline. Such memories are hereinafter referred to as "unshared" memories. Screen 2700 in FIG. 27 displays the unshared memories in a timeline view. When the user clicks on "Start Sharing . . . " 2702, the user is taken through the sharing process illustrated in FIGS. 28 and 23. When the user clicks on the previews of photos in the album 2704, the user should see the photos in screen 3200 as illustrated in FIG. 32.

Figure 29:
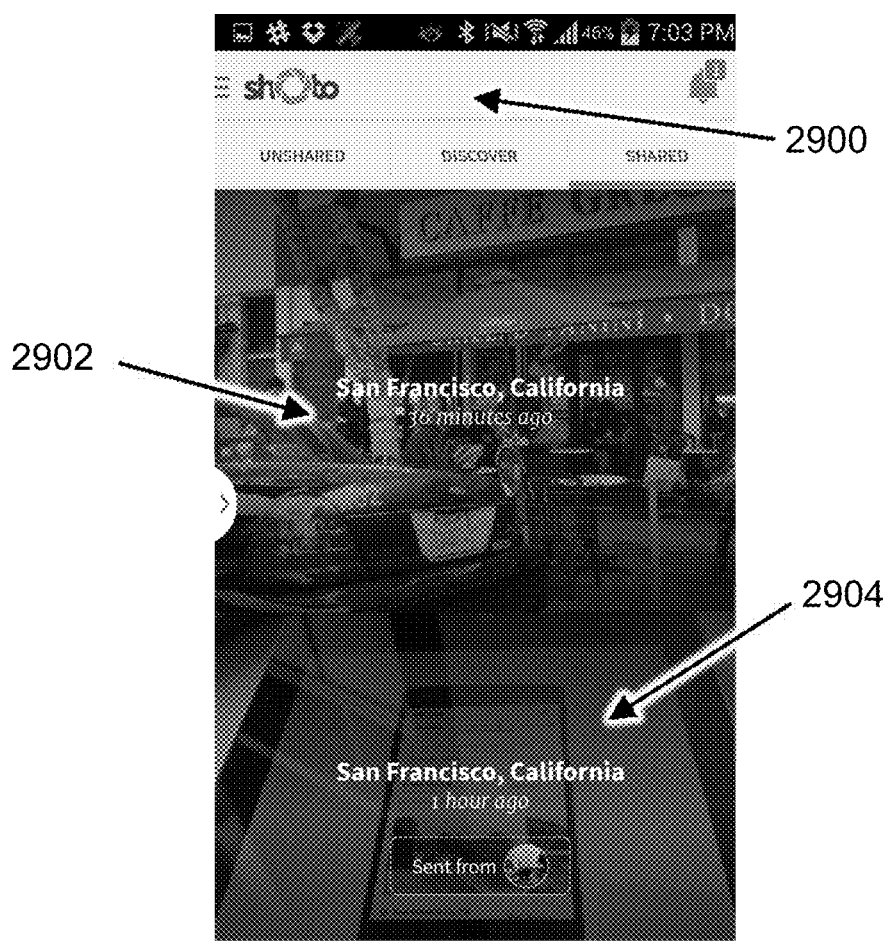
FIG. 29 depicts a non-limiting, exemplary mobile user interface; in this case a user interface for presenting a screen the user will only see if they have shared photos with, or received photos from, other Shoto users. The screen shows a list of albums that have been shared with other Shoto users, ordered by the date the photos in that album were found by the server.

Some implementations of the present invention allow memories that the user has shared or received to be grouped under a single tab. Screen 2900 in FIG. 29 displays the user's shared memories 2902 and received memories 2904.

Figure 38:
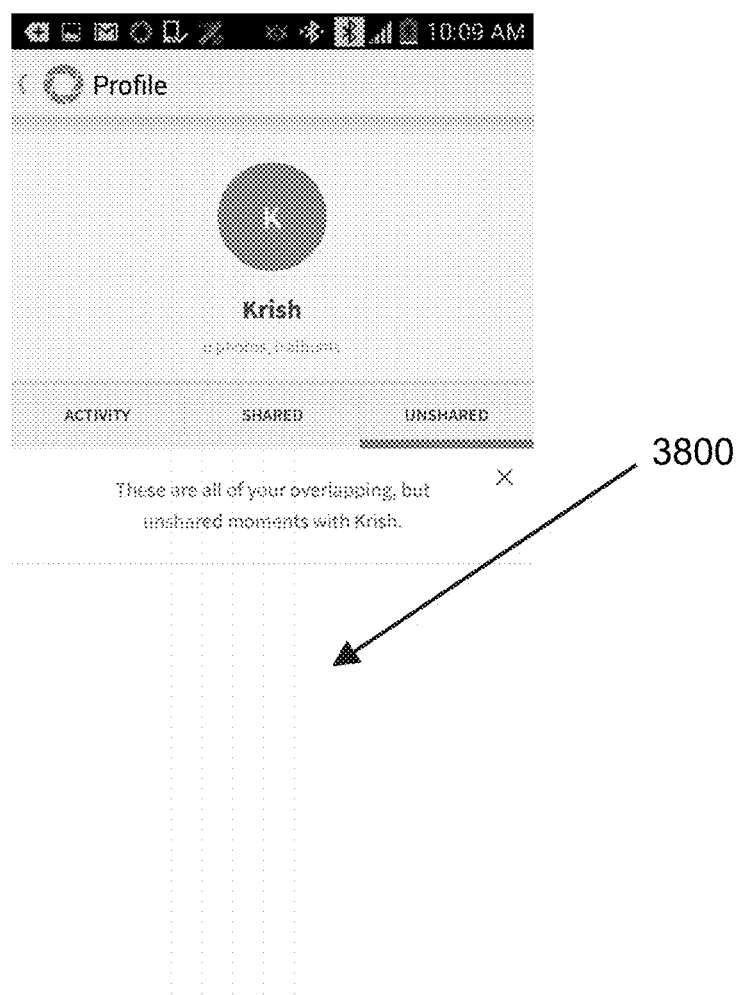
FIG. 38 depicts a non-limiting, exemplary mobile user interface; in this case a user interface for presenting a screen the user will see when they press on the unshared tab in another user's profile. The screen will show previews of any albums that contain photos that were taken when the user was with the other user. The screen will also show a button labeled "Start Sharing", beside the preview of the album. When the user presses the button, they will be able to share their photos from the album with the other Shoto user, as well as contacts from their phone book, not on Shoto.

There are certain implementations of the present invention that allow the user to see all of the undiscovered memories they shared with another user. In FIG. 38, screen 3800 shows how the user's undiscovered memories with another user.

Figure 37:
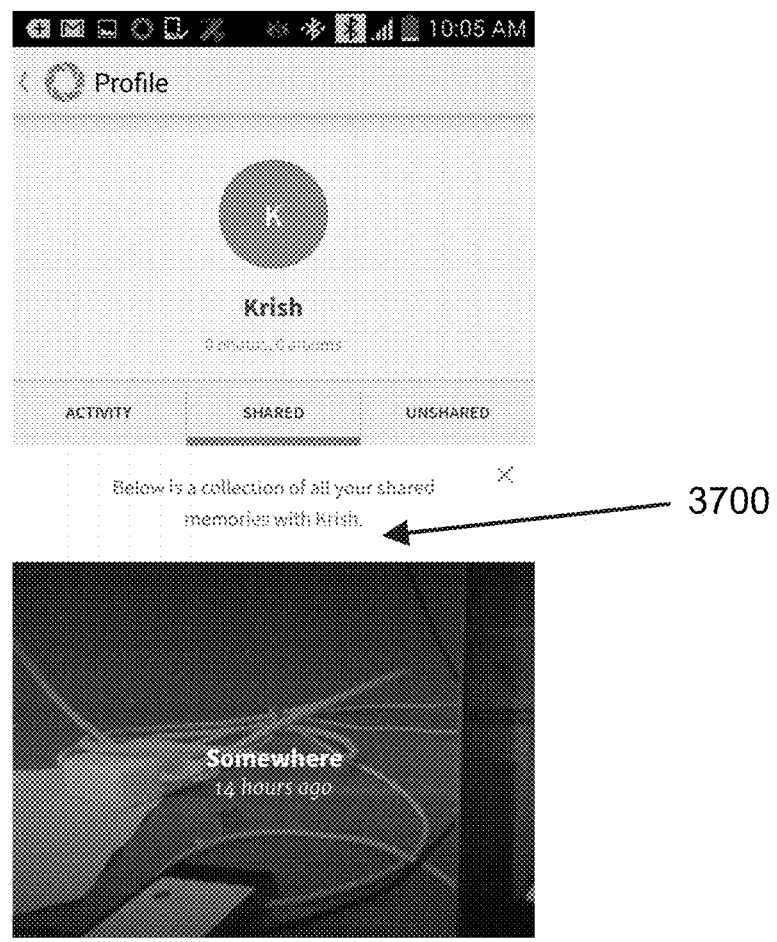
FIG. 37 depicts a non-limiting, exemplary mobile user interface; in this case a user interface for presenting a screen the user will see when they press on the shared tab in another user's profile. The screen will show previews of any albums that the user has shared with the other user since joining Shoto. When the user presses on the preview they will see the photos that belong to the shared album, in addition to who else can contribute to and view the album

There are certain implementations of the present invention that allow for the user to see all of their shared memories with another user. In FIG. 37, screen 3700 shows the user's shared memories with another user in a timeline view.

Digital Processing Device

In some embodiments, the platforms, systems, media, and methods described herein include a digital processing device, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® P54®, Microsoft® Xbox 360®, Microsoft Xbox One, Nintendo® Wii®, Nintendo® Wii U®, and Ouya®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-transitory Computer Readable Storage Medium

In some embodiments, the platforms, systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of photo and user information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

EXAMPLES

The following illustrative examples are representative of embodiments of the software applications, systems, and methods described herein and are not meant to be limiting in any way.

Example 1

A pair of spouses goes out for a night out on the town. During the night both spouses take some pictures on their respective phones. When they get home, the wife suggests that the husband download Shoto because of something she saw online, and so they both download the app together. The first thing they both see is a screen explaining what Shoto does. Casually they swipe through additional storyboard screens which all provide further explanation of how Shoto works. On each of the storyboard screens they see a button that says "Sign Up for Shoto."

The husband presses "Sign Up for Shoto" and is immediately asked to input his phone number. He selects the country he is in and inputs his phone number. After he is done inputting his phone number he presses a button that says "Send Verification Code." When he presses the button he is immediately taken to a screen that asks him input a verification code. He waits a couple of seconds for an SMS to arrive with the verification code.

When the verification code arrives, he types it into the space provided and presses "Complete Verification." After he presses "Complete Verification," he is taken to a screen that explains why he was asked for access to his photos when he first downloaded the app. He also sees a button that says "Sounds Good!" When he presses on the button he is taken to another screen that explains why Shoto accessed his location and contacts when he downloaded the app. Similar to the previous screen, he sees a button that says "Sounds Good!" When he presses the button he is taken to a screen that contains a list of all the people in his address book who are on Shoto and a separate list of all those who aren't. He notices that a good friend hasn't downloaded Shoto yet. He presses the button next to his friend's name that says "Invite." When he presses the button, it change to say "Remove" and his friend is added to a list of people who will receive an SMS from him with a link to download the app. After selecting a few more friends from his address book, he presses the button that says "Send Invite" and those selected friends will be sent a SMS. The button then changes to say "Complete Onboarding." When he presses on "Complete Onboarding" he is taken to a screen that has a suggested album. To his surprise he sees photos from the night of fun he had with his wife. When he presses on the button that says "Start Sharing" he sees her name at the top of a list of friends on Shoto. Her name is preselected. When he presses "Next," he sees a grid of photos he took from the night preselected. He can toggle the selected state of the photo by tapping on it. When he has selected the photos he wants to share with his wife and presses the button that says "Share," his photos will be shared to his wife.

After he presses "Share," he is taken to the main timeline of the app under a discover tab. Now, if his friend downloaded the app, and he took photos when the two were together, he sees those photos in his discover tab. He also sees a button that says "Start Sharing" associated with each of his undiscovered albums. When he presses "Start Sharing" he is taken through the same process as when he shared photos with his wife moments ago.

To view all the albums he shared, he goes to the shared tab on the timeline. He sees all the albums he has shared ordered by when the album was found. He can share all his unshared and shared albums to Facebook by pressing a Facebook icon. When he presses on the Facebook icon, he is taken to a Facebook upload screen where he can edit the location and add a description. After he selects the photos he wants uploaded to Facebook, he presses "Share" to upload those photos.

Not all of the pictures he has taken are with people. To see albums of pictures he took independently he goes to the "unshared" tab on the timeline. He sees albums of pictures he took by himself integrated with albums of photos that were taken with people that haven't been shared yet.

If he decides that a particular album is taking up to much space on his timeline, or the night ends up being one he'd rather forget, he can hide the album from his timeline. When he presses an icon, the album is removed from his timeline and the icon changes to a plus icon. He can access that album by pressing on "Settings" in the slide out menu, and then pressing "Removed Albums." If the hidden album was originally shared, it will appear under a Shared Removed Albums tab. If the hidden album was originally unshared, it will appear under an Unshared Removed Albums tab. To add an album back to the timeline, all he has to do is press the plus icon.

To see his notifications, he presses a bell icon. He will be notified when someone comments on one of his photos, if someone in his address book joins Shoto, if he is invited to view an album, and if an undiscovered moment he was part of is shared.

Example 2

A user plans to throw a birthday party tomorrow afternoon. To create an event, the user presses an interface button on a slide out menu of the Shoto mobile application. When the user presses the "create an event" button the user is taken to a page where they can specify the name of their event; when the birthday party begins and ends; where the party is going to be; and a message to send to friends. When the user is finished filling in fields, the user can press on "Create Envelope." When the user presses on "Create Envelope" the user is taken to screen, from which they can share the event with an invite URL through an array of options by pressing "Share Invite URL."

When the user invites someone who doesn't have Shoto, to the birthday party, the invited user can choose to download Shoto. When the invited user downloads Shoto, they are taken through the same onboarding process as the first user underwent when they first downloaded the app, with one small exception. After they verify their phone number they are immediately taken to an event screen. From the event screen they will be able to choose which of their photos from the birthday party they want to share to the event page, and share them.

The user wishes to see a list of their friends on Shoto. The user presses "Friends" on the slide out menu. When the user presses "Friends," the user is taken to a list of their friends on Shoto. Shoto will also send you memories every day that you could share with people and friends.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. A method for grouping a plurality of electronic images from a plurality of users into an event on a server, the server comprising at least one processor and a memory, the method comprising:
    a) associating, by a server, a first image associated with a first user and a second image associated with a second user with a first event based on information included in a first set of metadata associated with the first image and a second set of metadata associated with the second image;
    b) adding, by the server, the second image automatically to a unshared album of the second user;
    c) sending, by the server, an automatic notification to the second user that the second user has an image associated with the first event that has not been shared with the first user if:
        i) a social relationship between the first user and the second user is identified; and
        ii) the second image is not private, the automatic notification allowing access to the second image and access to initiate sharing of the second image by the second user; and
    d) moving, by the server, the second image automatically from the unshared album to a shared album of the second user upon receipt, by the server, of an instruction from the second user to initiate sharing of the second image.

2. The method of claim 1, further comprising: receiving, by the server, a first set of contact information associated with the first user and a second set of contact information associated with the second user; and comparing the first set of contact information with the second set of contact information to identify a match, wherein the social relationship between the first user and the second user is identified based on the match.

3. The method of claim 1, further comprising: associating a portion of a plurality of images with the first event, the plurality of images associated with the first user.

4. The method of claim 1, further comprising: creating, by the server, the first event using at least one of the first set of metadata and the second set of metadata.

5. The method of claim 1, further comprising: analyzing, by the server, the first set of metadata and the second set of metadata; and inferring the information about the first user and the second user based on the analyzing.

6. The method of claim 5, further comprising: generating, by the server, a recommendation for the first user or the second user based on the analyzing.

7. The method of claim 1, further comprising: analyzing, by the server, location information included in the first set of metadata and the second set of metadata; and determining a radius of proximity for the first event based on the analyzing.

8. The method of claim 1, further comprising: receiving, by the server, location-related information from an external source; and defining, by the server, properties of the first event using the location information.

9. The method of claim 1, further comprising:
    a) receiving, by the server, additional sets of metadata associated with additional users;
    b) receiving, by the server, sets of contact information associated with the additional users;
    c) receiving, by the server, a first set of contact information associated with the first user;
    d) analyzing, by the server, the first set of contact information, the additional sets of contact information and the additional sets of metadata associated with each of the additional users;
    e) determining, by the server, a plurality of users among the additional users who has at least one image associated with the first event;
    f) discovering, by the server, a subset of users among the plurality of users whose contact information is included in the first set of contact information; and
    g) informing, by the server, the first user about the determined subset of users.

10. The method of claim 1, further comprising:
    a) receiving, by the server, a third set of metadata, wherein the third set of metadata is associated with a third image associated with the first user and includes the information for the third image;
    b) comparing, by the server, the information for the third image to the information of the first image or the second image;

c) determining, by the server, that the information for the third image is different from the information of the first image or the second image;
d) creating, by the server, a second event based on the third set of metadata, wherein the second event has a defined beginning time and a defined end time that is different than the first event; and
e) associating, by the server, the third image with the second event instead of the first event based on the information associated with the third image.

11. The method of claim 10, further comprising: closing, by the server, the first event.

12. The method of claim 10, further comprising: merging, by the server, the first event and the second event into a merged event, wherein: a beginning time of the merged event is equal to or before than the beginning times of both the first event and the second event, and an end time of the merged event is equal to or after than the end times of both the first event and the second event.

13. The method of claim 1, further comprising: receiving, by the server, an instruction from the first user to share the first image with the second user; and
making the first image available to the second user.

14. The method of claim 1, further comprising:
a) receiving, by the server, a query from the first user to identify one or more images associated with the first user that belongs to a given event;
b) analyzing, by the server, sets of metadata associated with the plurality of images;
c) identifying, by the server, zero or more images based on the analyzing; and
d) providing, by the server, the identified zero or more images to the first user in response to the query.

15. The method of claim 1, further comprising sending, by the server, a second automatic notification to the first user that the second user has shared an image associated with the first event.

16. The method of claim 1, wherein the first image is a blank image generated by a first device in order to generate the first set of metadata.

17. The method of claim 1, wherein the information includes time information and location information of the first image and the second image.

18. The method of claim 1, further comprising: providing, by the sever, access to initiate sharing of the second image by the second user to a third user if a social relationship between the second user and the third user is identified, the third user having zero or more image associated with the first event.

19. A computer-implemented system comprising: a digital processing device comprising at least one processor, a memory, an operating system configured to perform executable instructions, and a computer program stored in the memory including instructions executable by the processor of the digital processing device to create a media sharing application comprising:
a) a software module configured to associate a first image associated with a first user and a second image associated with a second user with a first event based on information included in a first set of metadata associated with the first image and a second set of metadata associated with the second image;
b) a software module configured to add the second image automatically to a unshared album of the second user;
c) a software module configured to send an automatic notification to the second user that the second user has an image associated with the first event that has not been shared with the first user if:
    i) a social relationship between the first user and the second user is identified; and
    ii) the second image is not private,
    the automatic notification allowing access to the second image and access to initiate sharing of the second image by the second user; and
d) a software module configured to move the second image automatically from the unshared album to a shared album of the second user upon receipt of an instruction to initiate sharing of the second image from the second user.

20. The system of claim 19, wherein the application further comprises: a software module configured to receive a first set of contact information associated with the first user and a second set of contact information associated with the second user; and a software module configured to compare the first set of contact information with the second set of contact information to identify a match, wherein the social relationship between the first user and the second user is identified based on the match.

21. The system of claim 19, wherein the application further comprises: a software module configured to associate a portion of a plurality of images with the first event, the plurality of images associated with the first user.

22. The system of claim 19, wherein the application further comprises: a software module configured to create the first event using at least one of the first set of metadata and the second set of metadata.

23. The system of claim 19, wherein the application further comprises: a software module configured to analyze the first set of metadata and the second set of metadata; and a software module configured to infer the information about the first user and the second user based on the analyzing.

24. The system of claim 19, wherein the application further comprises: a software module configured to generate a recommendation for the first user or the second user based on the analysis.

25. The system of claim 19, wherein the application further comprises: a software module configured to analyze location information included in the first set of metadata and the second set of metadata; and determining a radius of proximity for the first event based on the analyzing.

26. The system of claim 19, wherein the application further comprises: a software module configured to receive location-related information from an external source; and a software module configured to define properties of the first event using the location information.

27. The system of claim 19, wherein the application further comprises:
a) a software module configured to receive additional sets of metadata associated with additional users;
b) a software module configured to receive sets of contact information associated with additional users;
c) a software module configured to receive a first set of contact information associated with the first user;
d) a software module configured to analyze the first set of contact information, the additional sets of contact information and the additional sets of metadata associated with each of the additional users;
e) a software module configured to determine a plurality of users among the additional users who has at least one image associated with the first event;

f) a software module configured to discover a subset of users among the plurality of users whose contact information is included in the first set of contact information; and g) a software module configured to inform the first user and about the determined subset of users.

28. The system of claim 20, wherein the application further comprises:

a) a software module configured to receive a third set of metadata, wherein the third set of metadata is associated with a third image associated with the first user including the information for the third image;

b) a software module configured to compare the information for the third image to the information of the first image or the second image;

c) a software module configured to determine that the information for the third image is different from the information of the first image or the second image;

d) a software module configured to create a second event based on the third set of metadata, wherein the second event has a defined beginning time and a defined end time that is different than the first event; and e) a software module configured to associate the third image with the second event instead of the first event based on the information associated with the third image.

29. The system of claim 28, wherein the application further comprises a software module configured to close the first event.

30. The system of claim 19, wherein the application further comprises: a software module configured to merge the first event and the second event into a merged event, wherein: a beginning time of the merged event is equal to or before than the beginning times of both the first event and the second event, and an end time of the merged event is equal to or after than the end times of both the first event and the second event.

31. The system of claim 19, wherein the application further comprises: a software module configured to receive an instruction from the first user to share the first image with the second user; and a software module configured to make the first image available to the second user.

32. The system of claim 19, wherein a plurality of images are associated with the first user and wherein the application further comprises:

a) a software module configured to receive a query from the first user to identify one or more images that belongs to a given event;

b) a software module configured to analyze sets of metadata associated with the plurality of images associated with the first user;

c) a software module configured to identify zero or more images based on the analyzing; and d) a software module configured to provide the identified zero or more images to the first user in response to the query.

\* \* \* \* \*